(12) United States Patent
Chen et al.

(10) Patent No.: US 7,188,366 B2
(45) Date of Patent: Mar. 6, 2007

(54) DISTRIBUTED DENIAL OF SERVICE ATTACK DEFENSE METHOD AND DEVICE

(75) Inventors: Eric Yi-hua Chen, Yokosuka (JP); Hitoshi Fuji, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 898 days.

(21) Appl. No.: 09/948,350

(22) Filed: Sep. 7, 2001

(65) Prior Publication Data
US 2002/0032854 A1 Mar. 14, 2002

(30) Foreign Application Priority Data
Sep. 12, 2000 (JP) ............................ P2000-276919
Sep. 12, 2000 (JP) ............................ P2000-276920

(51) Int. Cl.
*G06F 11/30* (2006.01)

(52) U.S. Cl. ............................ 726/23; 726/11; 726/13; 726/24; 726/25; 713/153; 709/249; 709/224; 709/235; 709/225

(58) Field of Classification Search .................. 726/11, 726/13, 24, 23, 25; 713/153; 709/249, 224, 709/225, 235
See application file for complete search history.

(56) References Cited

U.S. PATENT DOCUMENTS 6,009,475 A * 12/1999 Shrader ...................... 709/249
6,212,633 B1 * 4/2001 Levy et al. .................. 713/153
6,721,890 B1 * 4/2004 Shrikhande ................... 726/14
6,886,102 B1 * 4/2005 Lyle ............................ 726/23
2001/0014912 A1 * 8/2001 Segal ......................... 709/223

FOREIGN PATENT DOCUMENTS

JP 2000172499 A 6/2000
WO WO98/54644 * 3/1998

OTHER PUBLICATIONS

"Moving Firewall: An Active Networks Application For Defending Against DDoS Attacks" by Eric Y. Chen and Hitoshi Fuji, 61st National Convention of Information Processing Society of Japan, Oct. 2000.

(Continued)

*Primary Examiner*—Nasser Moazzami
*Assistant Examiner*—Tongoc Tran
(74) *Attorney, Agent, or Firm*—Darby & Darby

(57) ABSTRACT

When DDoS attack packets are transmitted from the attacker to the victim's server, the attack packets are detected in the edge router of the LAN accommodating the server. These packets are then destroyed, the address of the upstream routers close to the attack source are retrieved, and attack source retrieval modules are transmitted from the edge router to all the upstream routers. By executing the retrieval modules in the upstream routers, verification is performed as to whether the attack packets are passing through those upstream routers. The results are notified to the transmission source router and if the attack packets are passing through, the retrieval modules are transmitted to routers at the upper stream. When the router at the uppermost stream is reached, a protection module is executed to destroy the attack packets. When the attacks cease, the protection module deletes itself and the protection process is ended.

10 Claims, 24 Drawing Sheets

OTHER PUBLICATIONS

"RFC2267 Network Ingress Filtering: Defeating Denial of Service Attacks which employ IP Source Address Spoofing" by P. Ferguston and D. Senie, Jan. 1998.

"Center Track: An IP Overlay Network for Tracking DoS Floods" by Robert Stone, North American Network Operators Group, Oct. 1, 1999.

"On the Effectiveness of Probabilistic Packet Marking for IP Traceback under Denial of Service Attack" by Kihong Park and Heejo Lee, Network Systems Lab and CERIAS, Purdue University, Jun. 10, 2000.

"Practical Network Support for IP Traceback" by Stefan Savage, David Wetherall, Anna Karlin, and Tom Anderson, Proceedings of the 2000 ACM SIGCOMM Conference, pp. 295-306, Stockholm, Sweden, Aug. 2000.

"MULTOPS: a date-structure for bandwidth attack detection" by Thomer M. Gil and Massilimiano Poletto, Master's thesis, Vrje Universiteit, Aug. 2000.

Asaka, Midori. "Information-Gathering with Mobile Agents for Intrusion Detection System", The Transaction of the Institute of Electronics, Information and Communication Engineers D-I, vol. J81-D-1, No. 5, pp. 532-539, May 25, 1998.

Takeda, Keiji, et al., "On the Development of Intrusion Detection System with the Open Source Model", IPSJ (Information Processing Society of Japan) SIG (Special Interest Group) Notes, 2000-DPS-97-32, vol. 2000, No. 30, pp. 183-188, Mar. 21-22, 2000.

Katsuragawa, Masaharu. "Implementation and Opoeration of IDS (Intrusion Detection System)", Interop Magazine, vol. 10, No. 6, Softbank Publishing Inc., pp. 126-130, Jun. 2000.

Abstract. Japanese Translation of PCT Patent Application No. 2003-524925 with English patent abstract.

Tomobe, Minoru. "Active Network and Mobile Code Technology", Computer Software, vol. 17, No. 3, Japan Society for Software Science and Technology, pp. 86-92, May 15, 2000.

"Trailogue: Information Circulation Platform (2)—Network Security-", Business Communication, vol. 38, No. 8, Business Communcation Inc., pp. 70-79, Aug. 2001.

JP1/NETM/DM Manager explanation, operation, and syntax manual, Japan, Hitachi Ltd., Jun. 30, 2000, First Edition, p. 16, pp. 251-253, p. 255, pp. 257-258.

Masashi Shimizu, Windows 2000 Japanese prerelease edition (Beta 3 guide), DOS/V Power Report, Japan Impress Corporation, Oct. 1, 1999, vol. 9, Number 10, pp. 37-38.

Notice of Reasons for Rejection mailed Jul. 25, 2006.

* cited by examiner

ROUTER STRUCTURE

PROTECTION MODULE

STRUCTURE OF THE PRESENT INVENTION

| LAYER | FUNCTION |
|---|---|
| EXECUTION ENGINE | ■ MODULE RECEPTION<br>■ SERVICE MANAGER<br>■ MODULE EXECUTION POLICY MANAGEMENT<br>■ MODULE MOVEMENT |
| NODE KERNEL | ■ SYSTEM STARTUP / SHUTDOWN<br>■ CONCEALMENT OF OS FUNCTIONS<br>(PACKET FILTERING,<br>TRAFFIC SCHEDULE MANAGEMENT,<br>SOCKET MANAGEMENT,<br>ROUTING TABLE MANAGEMENT, ETC)<br>■ ALLOTMENT OF RECEIVED PACKETS |

DISTRIBUTED DENIAL OF SERVICE ATTACK DEFENSE METHOD AND DEVICE

BACKGROUND OF THE INVENTION

1. Field of the Invention

The present invention relates to a denial of service attack defense method and device for protecting devices connected to a network from an attack via that network, as well as to a computer program for this method.

2. Description of the Related Art

Conventionally, network protocols such as TCP/IP (Transmission Control Protocol/Internet Protocol) are open and are designed for use by mutually trustworthy groups. Therefore, no consideration has been given in computer operating systems to defending against denial of service attacks (referred to below as DoS attacks) that attempt to consume the bandwidth of a network and the resources of a server by sending to the server a huge volume of communication traffic (such as data and the like) so as to block the use thereof by legitimate users. Methods of protecting against this type of DoS attack are becoming more common, however, there are as yet no effective methods of protecting against distributed denial of service attacks (DDoS attacks) in which DoS attacks are carried out in cooperation simultaneously from a plurality of locations.

Methods of protecting against this type of DDoS attack include the Ingress Filter (RFC 2267) proposed by Cisco Systems, Inc. and Center Track from UUNET Technologies, Inc. The former is a mechanism for checking for source address spoofing that is often used in DDoS attacks. This mechanism is installed in a router forming the edge of a local area network connection to the Internet and checks the legitimacy of the source addresses of packets that are sent from the local area network to the Internet. When these do not conform to addresses that have been allocated to the local area network, that packet is not sent to the Internet, but is instead destroyed.

This technology is intended to prohibit DDoS attacks launched with spoofed source addresses and is not used for protecting the victim from an attack. Meanwhile, the latter technology adds a diagnostic function to the Internet router so as to track the source of the DDoS attack. This technology assists the victim from an attack in identifying the attacker, however, they do not protect the victim during the attack.

The Ingress Filter disclosed in the aforementioned RFC 2267 has the problems that it has absolutely no way of countering an attack with IP packets whose source IP (Internet Protocol) addresses are legitimate and that it is absolutely ineffective in protecting from an attack when the Ingress Filter is not installed in the router forming the edge between the Internet and the local area network that is the source of the attack. Moreover, the Center Track technology has the problem that, in order to stop an attack, it requires the victim to contact the owners of the computers participating in a DDoS attack or the administrators of the networks to which those computers are connected. This notification process may take up to several hours or even several days before an attack is stopped.

SUMMARY OF THE INVENTION

Accordingly, it is an aim of the present invention to provide a method and device for countering a distributed denial of service attack as well as to a computer program for executing the method that, when protecting against a DDoS attack, is able to counter the attacks regardless of the legitimacy of the source addresses.

According to the present invention, the above aim is achieved by providing a communication device for defending against a distributed denial of service attack, comprising: a traffic monitoring function section that monitors communication packets passing through the communication device and detects distributed denial of service attacks; a protection module that destroys the distributed denial of service attack packets when the distributed denial of service attacks are detected; an attack source retrieval module that retrieves addresses of communication devices that are close to attack sources at the upstream; a module transmitting section that transmits the attack source retrieval module to a communication device in a defense position at the upstream; and an attack source determining function section that extracts the address of a communication device to be chosen as an upstream defense position from the candidates of upstream communication device close to the attack sources retrieved by the attack source retrieval module, wherein the module transmitting section transmits the protection module to the communication device at the upstream defense position extracted by the attack source determining function section.

By using a communication device such as this, when a distributed denial of service attack is detected, in addition to the attack packets being destroyed in the detected communication device, upstream communication devices closer to the attack source are retrieved, attack source retrieval modules are transmitted to the upstream communication devices obtained as a result of this retrieval, a determination is made as to whether or not the attack packets are passing through the upstream modules by executing the modules in these upstream communication devices, and if they are passing through, communication devices at upper stream are retrieved recursively. As a result of this being possible, it is possible to provide protection against the attack in the communication device situated in the uppermost stream closest to the attack source, namely, to destroy communication packets of the attack. Consequently, it is possible to minimize the effects of the attack packets to a locality near the attack source, and also to inhibit the harmful effects thereof on the network as a whole.

In addition, even if the network is one not conventionally provided with an attack protection function, such as is the case with the Internet, effective protection is made possible through the application of the present invention. Moreover, if the present invention is used, it is possible for the protection function to start up automatically and provide protection against an attack through measures to deal with the attack being taken in the network connected to the device under attack without any measures needing to be taken by the manager of the network to which the attacker is directly connected.

Furthermore, the aim of the present invention can also be achieved by a communication device for defending against distributed denial of service attacks, comprising: a traffic monitoring function section that monitors communication packets passing through the communication device and detects distributed denial of service attacks; a protection module that destroys distributed denial of service communication packets when a distributed denial of service attack is detected, and performs process to retrieve addresses of communication devices that are close to attack sources at the upstream; and a module transmitting section that transmits the protection module to the upstream communication device.

By using a communication device such as this, it is possible to retrieve the source of an attack and to protect against an attack in a single program module and to simplify the protection algorithms.

Furthermore, the present invention is formed as a communication system comprising: a module server that transmits a program module to the communication device, the module server comprising: a program module database that stores program modules to be installed on the communication device; a developer database that stores information of program module developers who are authorized to upload program modules; a user database that stores information of users who are allowed to request the program modules to be installed on the communication device; a service menu that displays a list of available program modules to the user; a service manager that authenticates a user's authorization when the user requests to install a program module displayed on the service menu; and a service module injector that transmits the program module to the communication device upon successful authentication. By forming the present invention in this way, it is made possible for only the program modules developed by a predetermined developer to be executed in a communication device, thereby further improving the security of the communication system.

DETAILED DESCRIPTION OF THE PREFERRED EMBODIMENTS

The following embodiments do not restrict the interpretation of the claims relating to the present invention, and a combination of all the features described in the embodiments is not always an indispensable means of attaining the objectives.

(First Embodiment)

Figure 1:
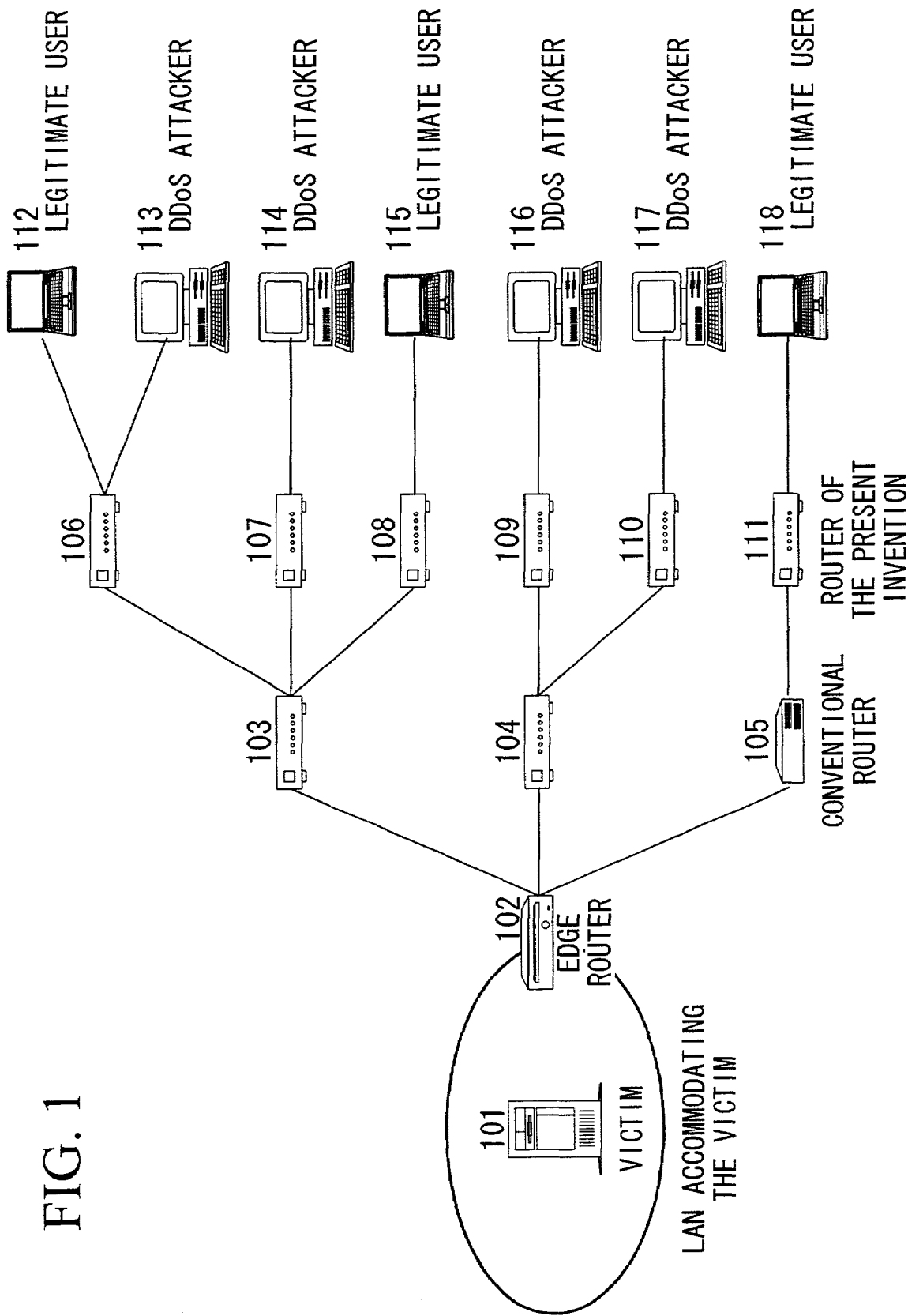
FIG. 1 is a structural view of a network to which the present invention can be applied.

A detailed description is given below using the drawings of the embodiments of the present invention. FIG. 1 is a structural view of a network to which the present invention can be applied. The hosts 113, 114, 116, and 117 operated by DDoS attackers send attacking packets to the server 101 of the victim. The local area network (LAN) in which the server 101 of the victim is accommodated is connected to an external network by an edge router (communication device) 102. The mobile packet filtering function of the present invention is installed in this edge router 102. The routers (communication device) 103, 104, 106, 107, 108, 109, 110, and 111 are also routers to which the technology of the present invention can be applied. These routers are provided with the function of being able to receive programs sent via the network and execute these programs. Note that the router 105 is a conventional router in which the technology of the present invention has not been applied.

In FIG. 1, the packets generated by the DDoS attack cause congestion in the LAN accommodating the victim. As a result, the resources of the edge router 102 are over-consumed and, because of the congestion, the computers 112, 115, and 118 of legitimate users unrelated to the DDoS attacker are unable to access the server 101.

Figure 2:
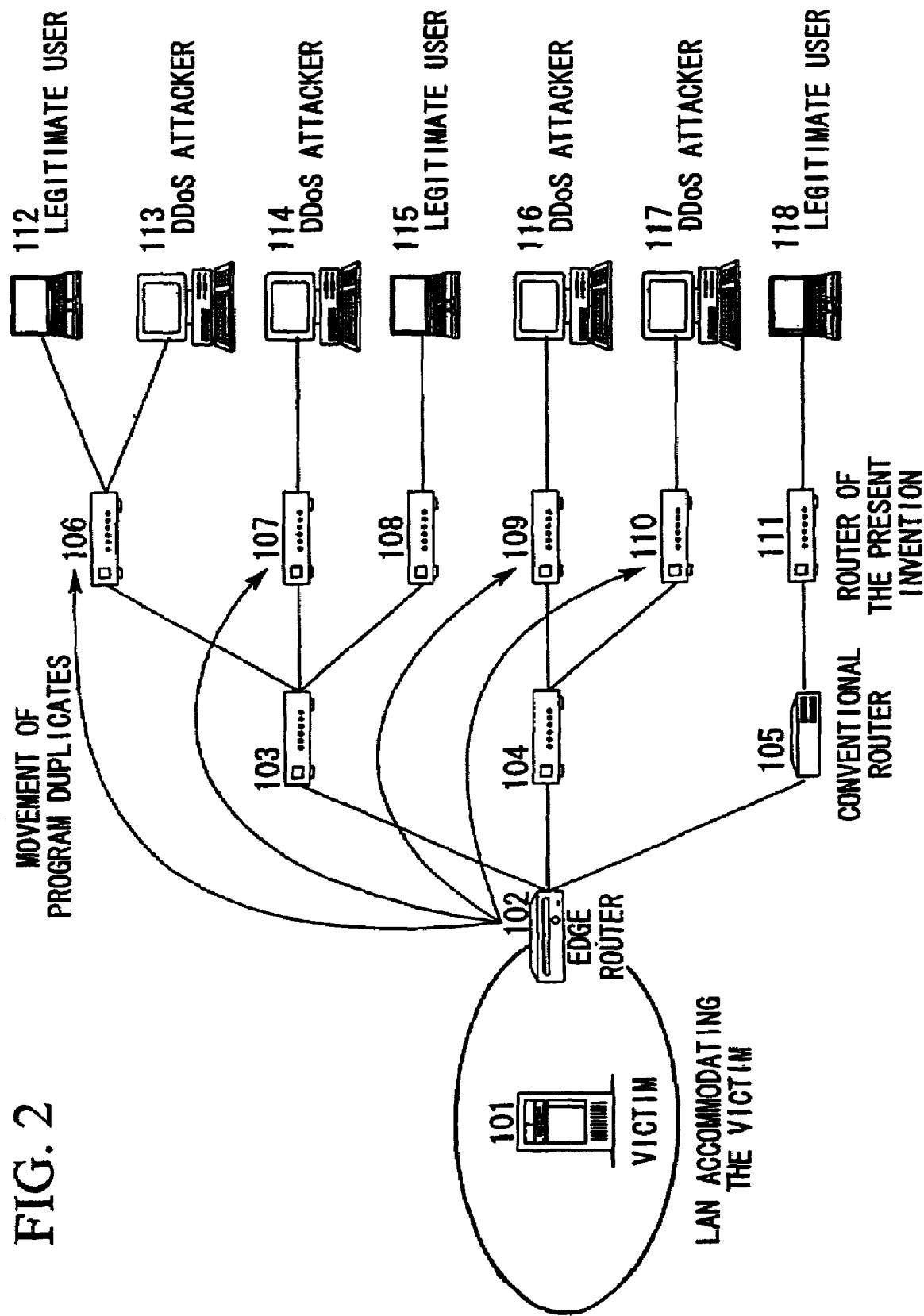
FIG. 2 is a schematic view showing the protection method for protecting against a distributed denial of service attack carried out in the network shown in FIG. 1.

Next, FIG. 2 shows a method of protecting against DDoS attacks occurring in the network shown in FIG. 1. In the embodiment shown in FIG. 2, the mobile packet filtering program of the present invention installed in the edge router 102 creates duplicate programs of itself and moves the duplicate programs by a method described below to the routers 106, 107, 109, and 110. The mobile packet filtering programs that have been moved to the respective routers do not allow any of the traffic sent from the respective DDoS attack hosts 113, 114, 116, and 117 to the server 101 to pass through. As a result, the load on the edge router 102 is alleviated and the congestion on the LAN accommodating the victim is stopped. Moreover, access to the server 101 from the computers 112, 115, and 118 of legitimate users other than the DDoS attackers is resumed. Thereafter, when the attack on the server 101 from the hosts 113, 114, 116, and 117 of the DDoS attackers has ended, the mobile packet filtering programs installed on the routers 106, 107, 109, and 110 send the history log of the attack to the original mobile packet filtering program installed on the edge router 102 and delete themselves from the routers 106, 107, 109, and 110. The mobile packet filtering programs of the present invention can also be used for various network modes and communication contents.

Next, the procedure of the mobile packet filtering process will be described with reference made to the flow charts shown in FIGS. 3 and 4. In the initial state, this mobile packet filtering program is installed on an edge router (for example, the router 102 in the networks shown in FIGS. 1 and 2) situated at the connection point where the network being protected is connected to other networks.

Figure 3:
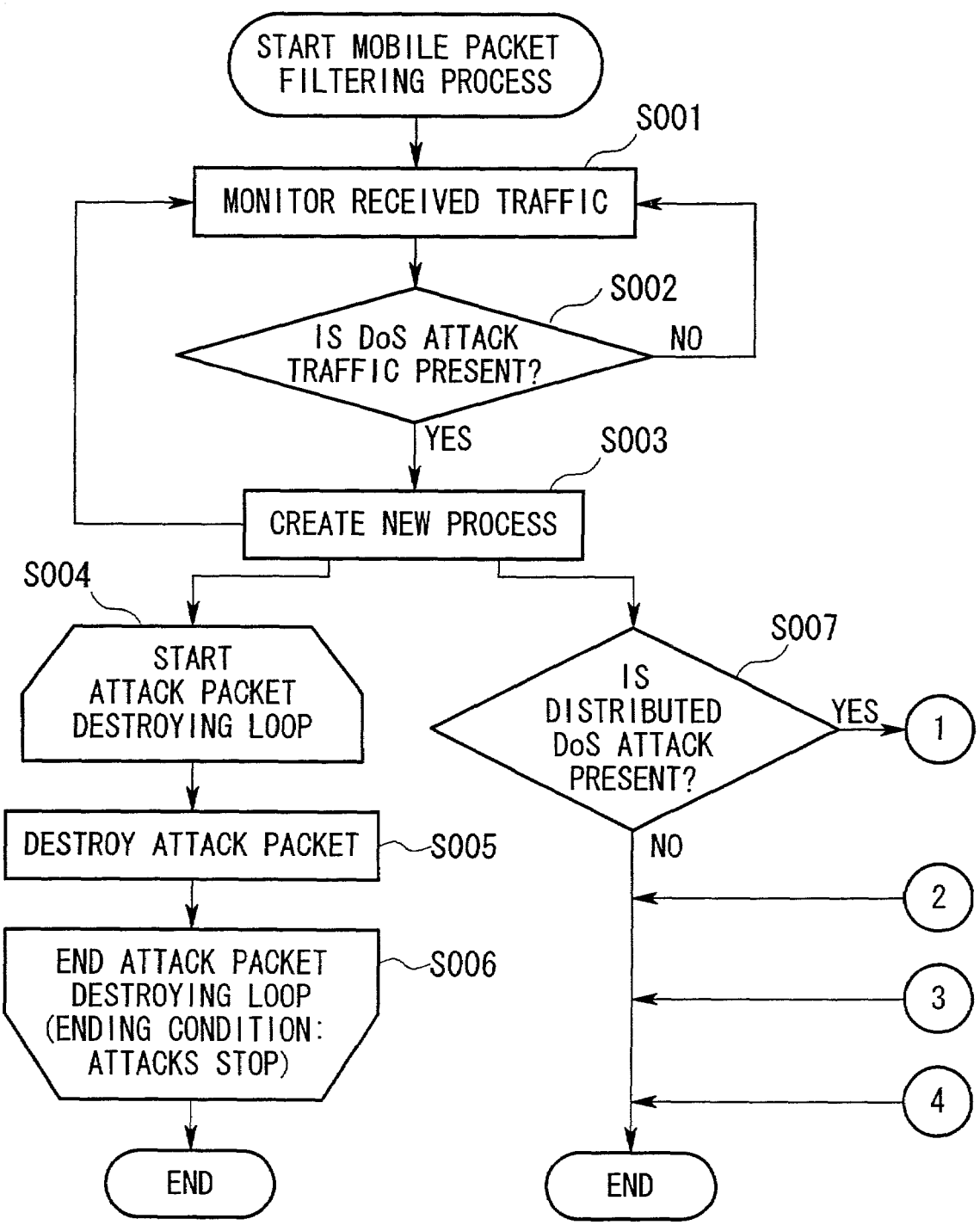
FIG. 3 is a partial view of a flow chart showing the procedure for a mobile packet filtering process according to the first embodiment of the present invention.

In this state, in step S001 shown in FIG. 3, the mobile packet filtering program monitors transferred incoming packets (i.e. traffic). Next, in step S002, a determination is made as to whether or not the result of the monitoring comprises a DoS attack. If the result of this determination is that a DoS attack has not been detected, the routine moves from step S002 back to step S001. Namely, when a DoS attack is not detected, the monitoring of step S001 and the determining of step S002 are repeated. Note that, in step S002, it is possible to detect the pattern of the data of a DoS attack using DoS attack detection algorithms that are existing technology.

If a DoS attack is detected in step S002, the routine moves to step S003. In step S003, a new process is created. It is possible for the original process and the newly created process to proceed in parallel with each other. The original process returns to step S001 and continues to monitor the incoming traffic.

As is described in steps S004 to S006, the first newly created process in step S003 performs process to destroy the detected attack packet in the relevant router. The destroying process of the attack packets continues while the attack packets continue to arrive. If the attack packets stop, the attack packet destroying process is terminated automatically.

As is described in steps S007 to S014, the second newly created process in step S003 performs process to move a defense position to the upstream router. Firstly, in step S007, a determination is made as to whether or not the attack is a DDoS attack. Note that this determination of whether or not the attack is a DDoS attack can be performed using existing technology. If the result of this determination is that the attack is not a DDoS attack, the process ends at that point. If the result of the determination is that the attack is a DDoS attack, the routine moves to step S008 shown in FIG. 4.

In step S008, routers that might be the upstream router are retrieved by referring to an adjacent router database installed in the relevant router. Here, routers that might be the upstream router are routers adjacent to the relevant router and are also routers that are able to fulfill the mobile packet filtering functions of the present invention. If the network shown in FIG. 2 is used as an example, the routers 103, 104, and 111 are stored in the adjacent router database installed in the edge router 102 as routers that may be the upstream router. The routers 103 and 104 are adjacent routers to the edge router 102 and are also are able to fulfill the mobile packet filtering functions of the present invention. Because the router 105 is a conventional router in which the present invention has not been applied, the router 111 that is the subsequent router on the path from the edge router 102 through the router 105 becomes the upstream router of the edge router 102. Namely, information on the routers that are adjacent in the network topology among the routers equipped with the technology of the present invention is stored in the adjacent router database.

A determination is made in step S009 about the results of the retrieval in step S008 and if an upstream router is not retrieved (i.e. of the result of the determination is NO), the process is ended. If an upstream router is retrieved (i.e. if the result of the determination is YES), the routine moves to the next step S010. In the example shown in FIG. 2, because the upstream routers 103, 104, and 111 are retrieved as adjacent routers to the edge router 102, the routine moves to step S010.

In step S010, an attack source retrieval module holding the information on the DDoS attack packets currently being retrieved is sent to the upstream routers 103, 104, and 111 detected as described above.

In step S011, by executing the attack source retrieval module in those upstream routers that have received the attack source retrieval module, the attack source retrieval module retrieves the optimum positions for defending against the attack and sends back the results to the downstream routers that are the source of the transmissions. Note that if a new router of the present invention is discovered at the upper stream, the attack source retrieval module is sent to that router and the defense positions are retrieved recursively.

In step S012, the original router receives the retrieval results from the upstream router and disposes of redundant information on the received addresses. A detailed description is given below about this disposal of the redundant information. When all redundant information is disposed, in step S013, the system verifies whether or not the received addresses are present. If none are present (i.e. if the result of the check is NO), the process ends at that point. If addresses are present (i.e. if the result of the check is YES), then in step S014, protection modules are transferred to the addresses that remain after the disposal of the redundant information and the routine is then ended.

Figure 5:
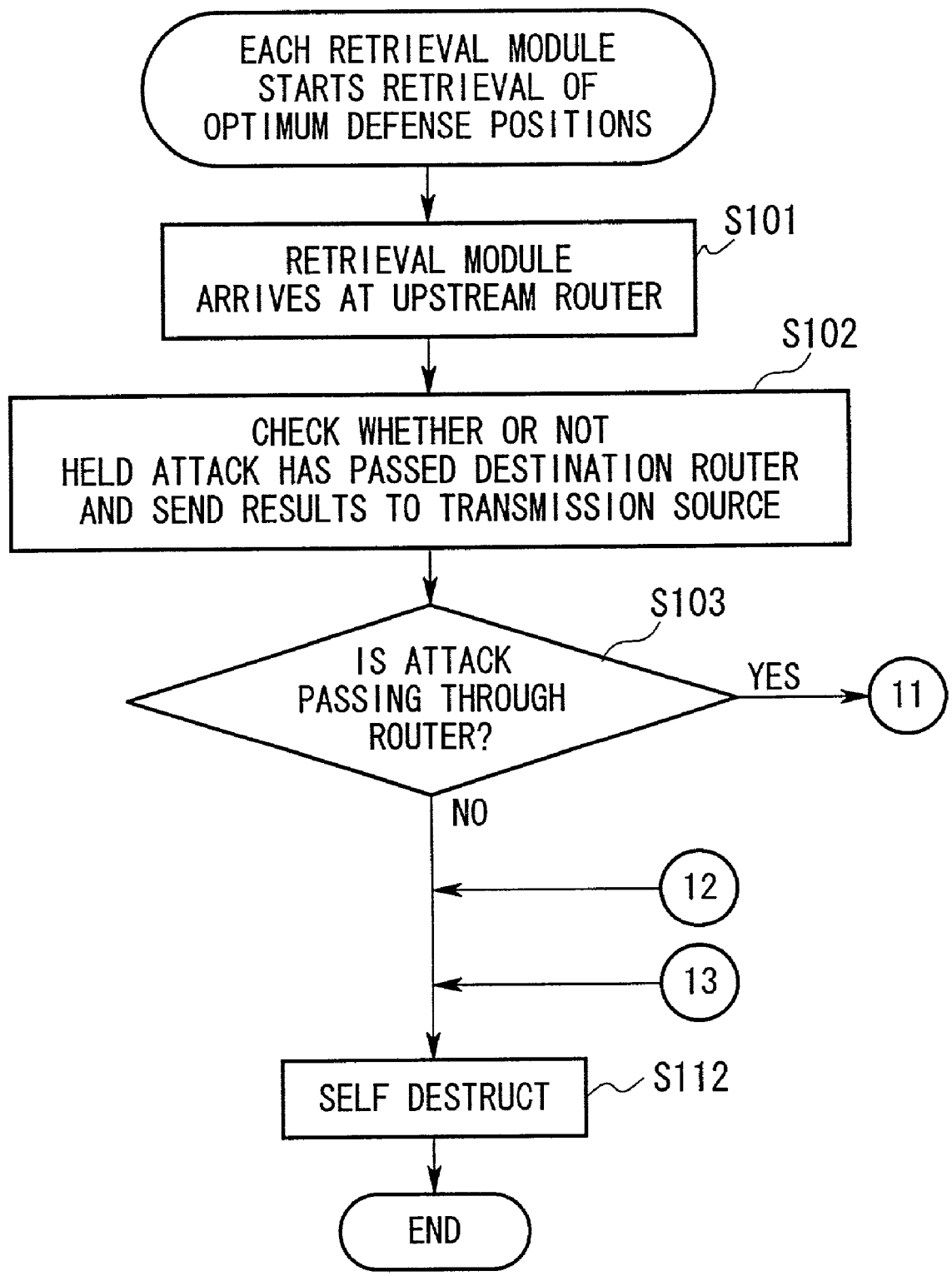
FIG. 5 is a partial view of a flow chart showing the procedure of an attacking source retrieval module process according to the first embodiment of the present invention.
Figure 6:
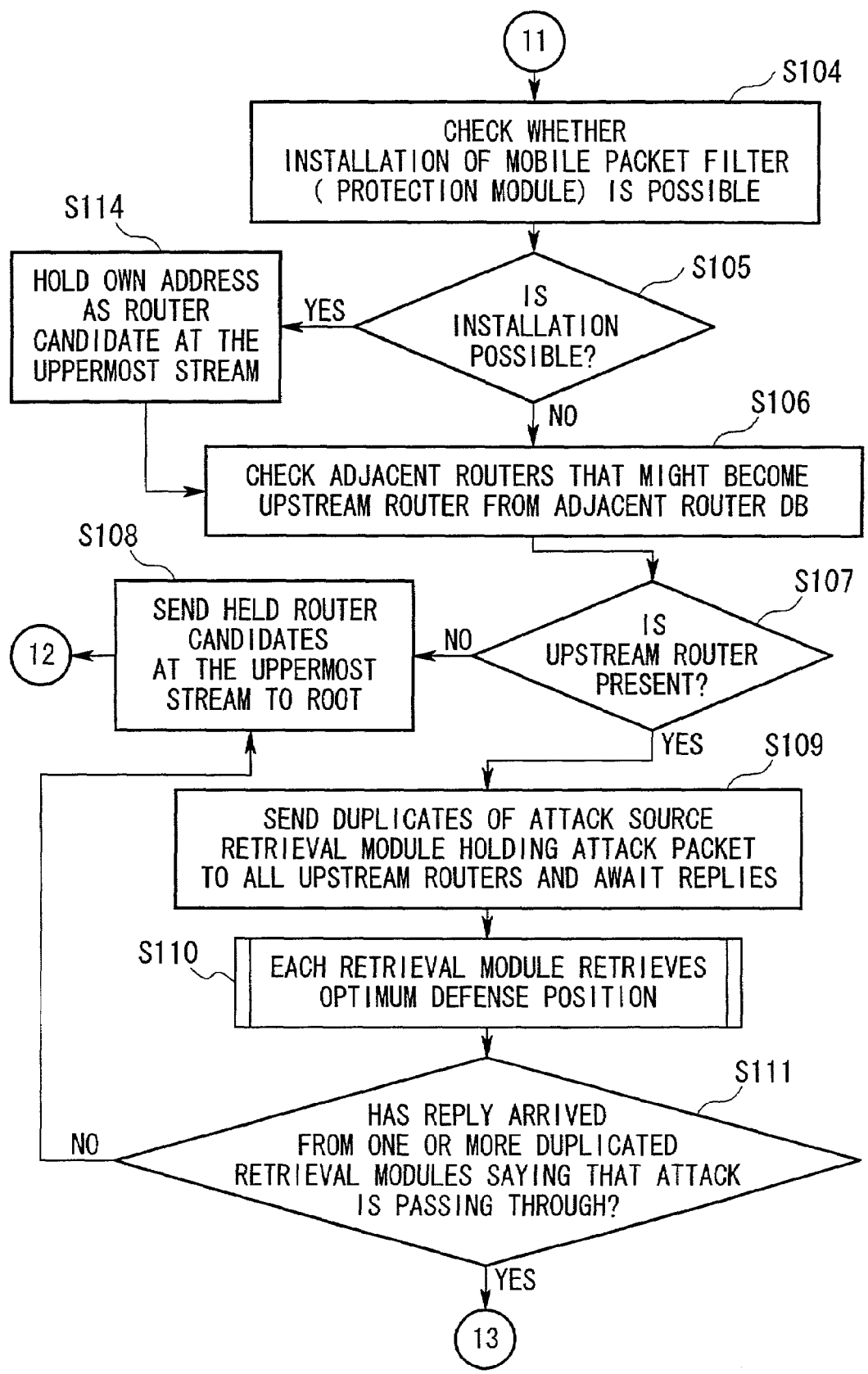
FIG. 6 is a partial view of a flow chart showing the procedure of an attacking source retrieval module process according to the first embodiment of the present invention.

Next, a description will be given with reference made to the flow charts in FIGS. 5 and 6 of the contents of the process of the attack source retrieval module accessed in step S011 in FIG. 4. In step S101 in FIG. 5, the transmitted attack source retrieval modules arrive at the upstream routers. In the example of the network shown in FIG. 2, these modules arrive at the respective upstream routers 103, 104, and 111 from the edge router 102. In this case, a description is given of the execution of the module that arrives at the router 103.

In step S102, whether or not the attack packets have passed the router 103 is checked using the attack packet information held in the attack source retrieval module and the results of the check are made known to the transmission source router. The result of the check in step S103 is then checked and if the attack packets have not passed the router 103 (i.e. if the result of the check is NO), the routine moves immediately to step S112. If the attack packets have passed the router 103 (i.e. if the result of the check is YES), the routine moves to step S104 shown in FIG. 6.

In step S104, a check is made as to whether or not the installation of a protection module is possible. This check can be made, for example, by checking whether or not there are sufficient resources of various types needed for the module to operate on the relevant router. In step S105 the results of this check are determined and if installation is possible (i.e. if the result of the determination is YES), then in step S114, the router (in this case, the router 103) holds its own address as a candidate for the address of the router at the uppermost stream and moves to step S106. If the installation is not possible (i.e. if the result of the determination is NO), the routine moves at that point to step S106.

In step S106, the router (103) retrieves adjacent databases that might become upstream routers by referring to the adjacent router database with which it is provided. In the case of the router 103, the routers 102, 106, 107 and 108 are extracted as adjacent routers.

Next, in step S107, a check is made as to whether or not a router at upper stream is present in the routers extracted as described above. In this case, because the router 102 is the transmission source of the attack source retrieval module, it is not a router of upper stream than the router 103; instead the routers 106, 107, and 108 are upper stream routers. If there is no upper stream router (i.e. if the result of the check in step S107 is NO), the routine moves to step S108 and the held candidates of the routers at the uppermost stream are transmitted to the transmission source of the attack source retrieval module. If an upper stream router is present (i.e. if the result of the check is YES), the routine moves to step S109.

In step S109, the attack source retrieval module holding information on the DoS attack is duplicated and sent to all detected upstream routers. Replies from all the duplicated attack source retrieval modules are then awaited.

In step S110, the process for the retrieval of the optimum defense position is performed by the upstream routers that received the attack source retrieval modules sent in step S109 executing the modules. Namely, the upstream routers are retrieved recursively.

In step S111, the replies from the duplicated and transmitted attack source retrieval modules are examined and if in the reply from one or more retrieval modules the information that an attack is passing through is contained (i.e. if the reply is YES), then the routine moves at that point to step S112 where the modules self destruct and the process is ended. If, however, the contents of all the replies from the retrieval modules are to the effect that an attack is not passing through (i.e. if the reply is NO), the routine moves to step S108 and the held candidates of the routers at the uppermost stream are sent to the transmission source of the attack source retrieval modules.

Figure 7:
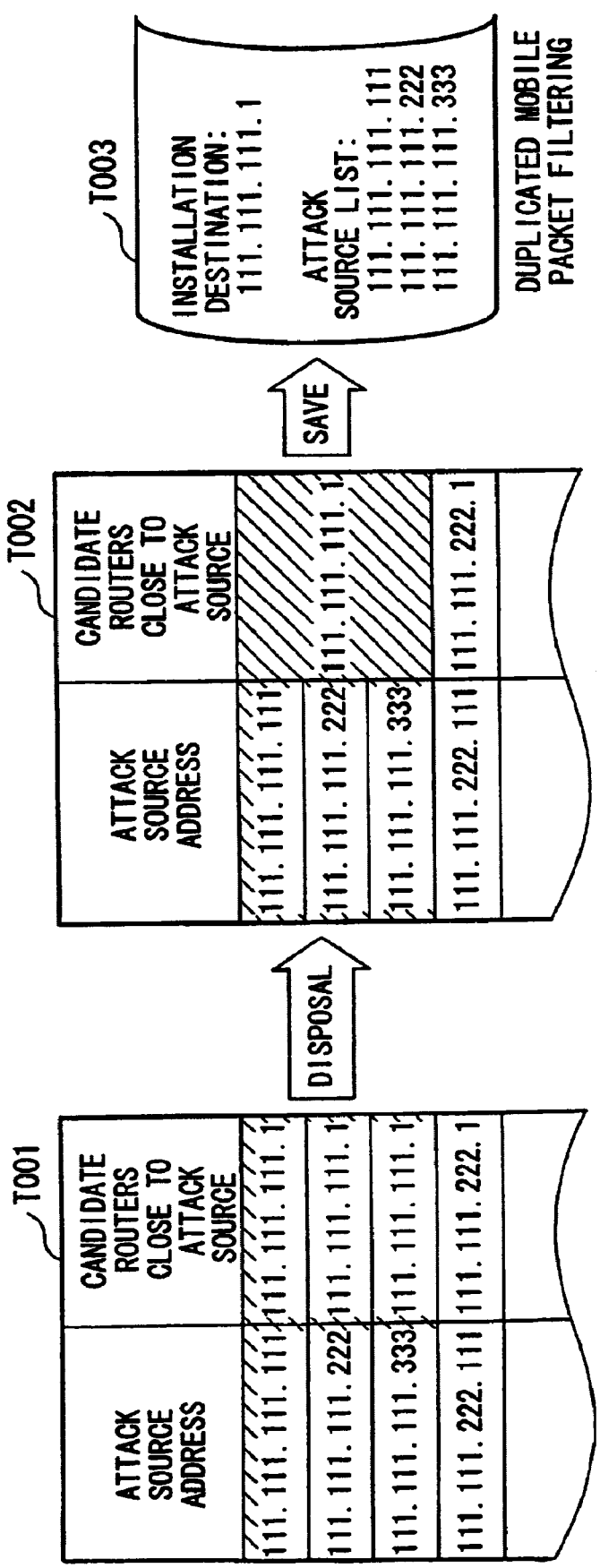
FIG. 7 is a schematic view showing the procedure for disposing redundant information on addresses of upstream routers close to the attack source according to the first embodiment of the present invention.

A description will now be given in detail of the method of disposing of redundant information in the addresses in the retrieval results described in step S012 in FIG. 4. FIG. 7 is a schematic view showing the procedure for disposing of redundant address information. As a result of this procedure, the mobile packet filtering program detects the router closest to the source of the attack at every identified attack.

Table T001 shown in FIG. 7 represents information collected as a result of the retrieval. In the case of this example, the possibility exists that the router closest to the attack source (i.e. having the attack source addresses of 111.111.111.1) is the same for the respective attacks represented in the first line to the third line of the table (i.e. having the attack source addresses of 111.111.111.111, 111.111.111.222, and 111.111.111.333). This type of redundant information is edited and summarized into one in Table T002.

The number of duplicated mobile packet filtering programs made is not the same as the number of attacks that can be detected from Table T001 but is the number of routers detected from Table T002 so that the same mobile packet filtering programs are not duplicated unnecessarily and sent to the same upstream router. Moreover, not all the duplicated mobile packet filtering programs hold all the collected information such as in Table T002, but only that information that is used by the mobile packet filtering to protect against attacks at the destination where the duplicated mobile packet filtering programs are moved is extracted and saved in an efficient format such as that shown in Table T003.

Figure 8:
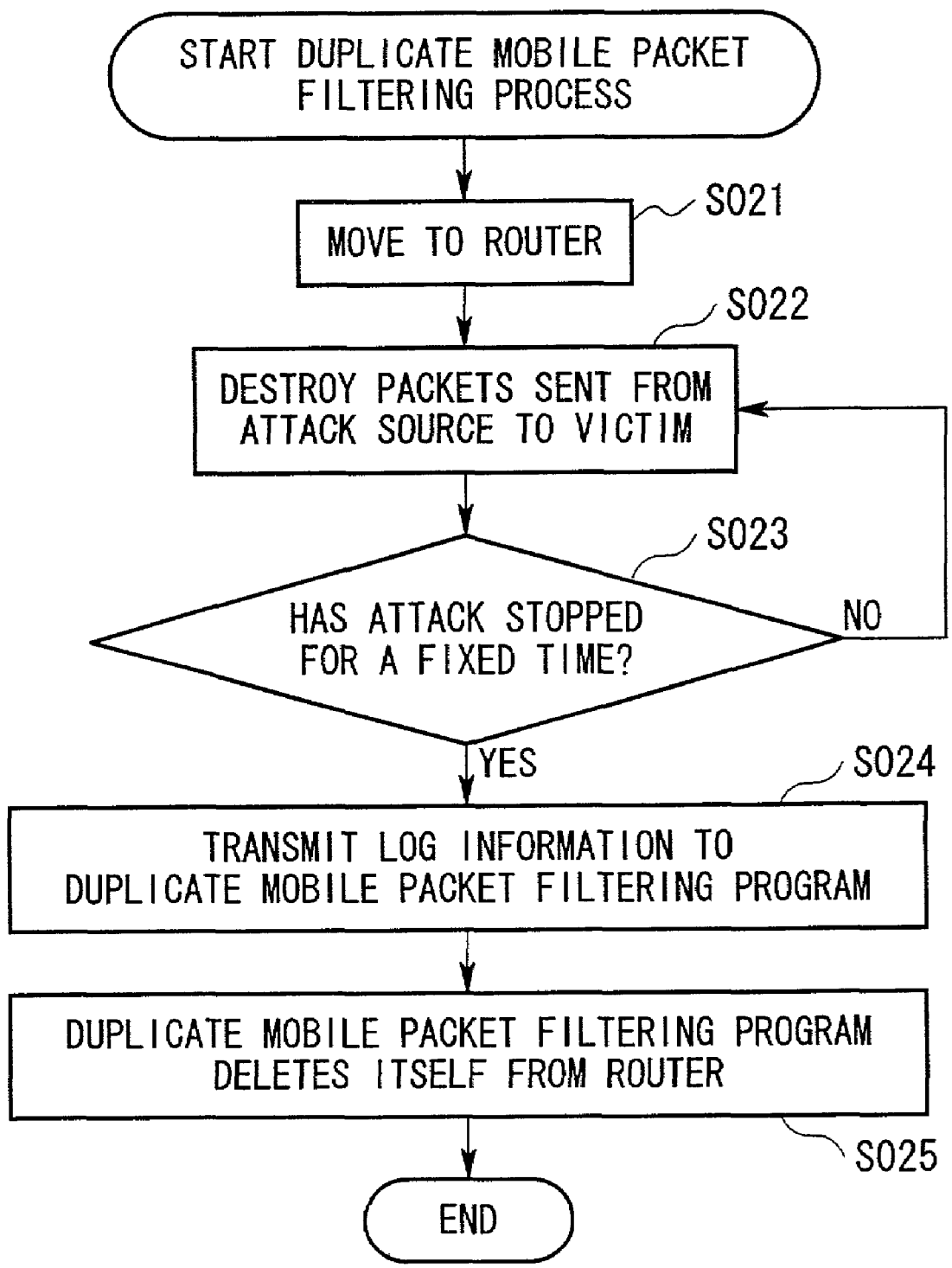
FIG. 8 is a flow chart showing the procedure of a mobile packet filtering program process according to the first embodiment of the present invention.

Next, a description will be given of the procedure of the aforementioned duplicated mobile packet filtering program process. FIG. 8 is a flow chart showing the procedure of the mobile packet filtering program process. The description given below follows this flow chart.

Firstly, in step S021, when duplicated information needed to defend against an attack is received, the program is moved (transmitted) to a router on which it should be installed. Next, the routine moves to step S022 in which process is performed to destroy all packets from the attack source sent to the victim by the router on which the program has been installed. Next, the routine moves to step S023 in which the time from when the last attack stopped is measured. If the attack is recommenced before a fixed time has elapsed when the last attack stopped, the routine returns to step S022 and continues the protection. If the fixed time has elapsed when the last attack stopped, the routine moves to step S024.

In step S024, the history log of the attack is sent to the original mobile packet filtering program. Lastly, the routine moves to step S025 where the program deletes itself from the router and the process is ended.

Figure 9:
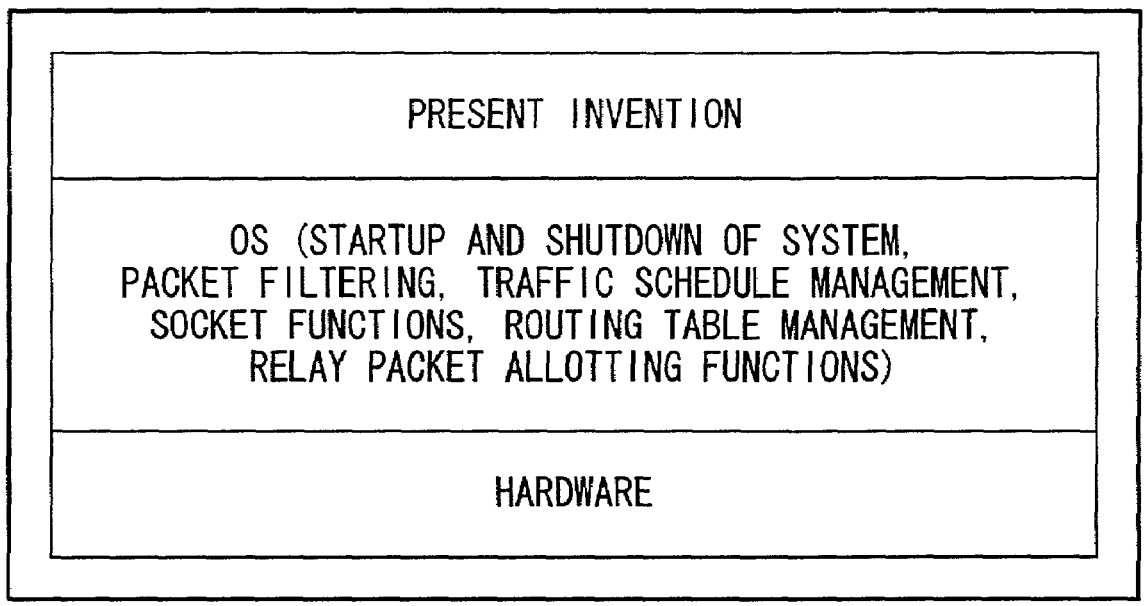
FIG. 9 is a structural diagram showing the structure of a router according to the first embodiment.

Next, a description will be given of the structure for executing the above described process. FIG. 9 is a structural view showing the structure of the router according to the present embodiment. As is shown in FIG. 9, an operating system (OS) operates on the hardware of this router, and the module of the present invention operates on this operating system. Note that the above operating system controls the startup and shutdown of the entire system and provides functions such as the packet filtering functions, the traffic schedule management functions, the socket functions, the routing table management functions, and the relay packet allocation functions.

Figure 10:
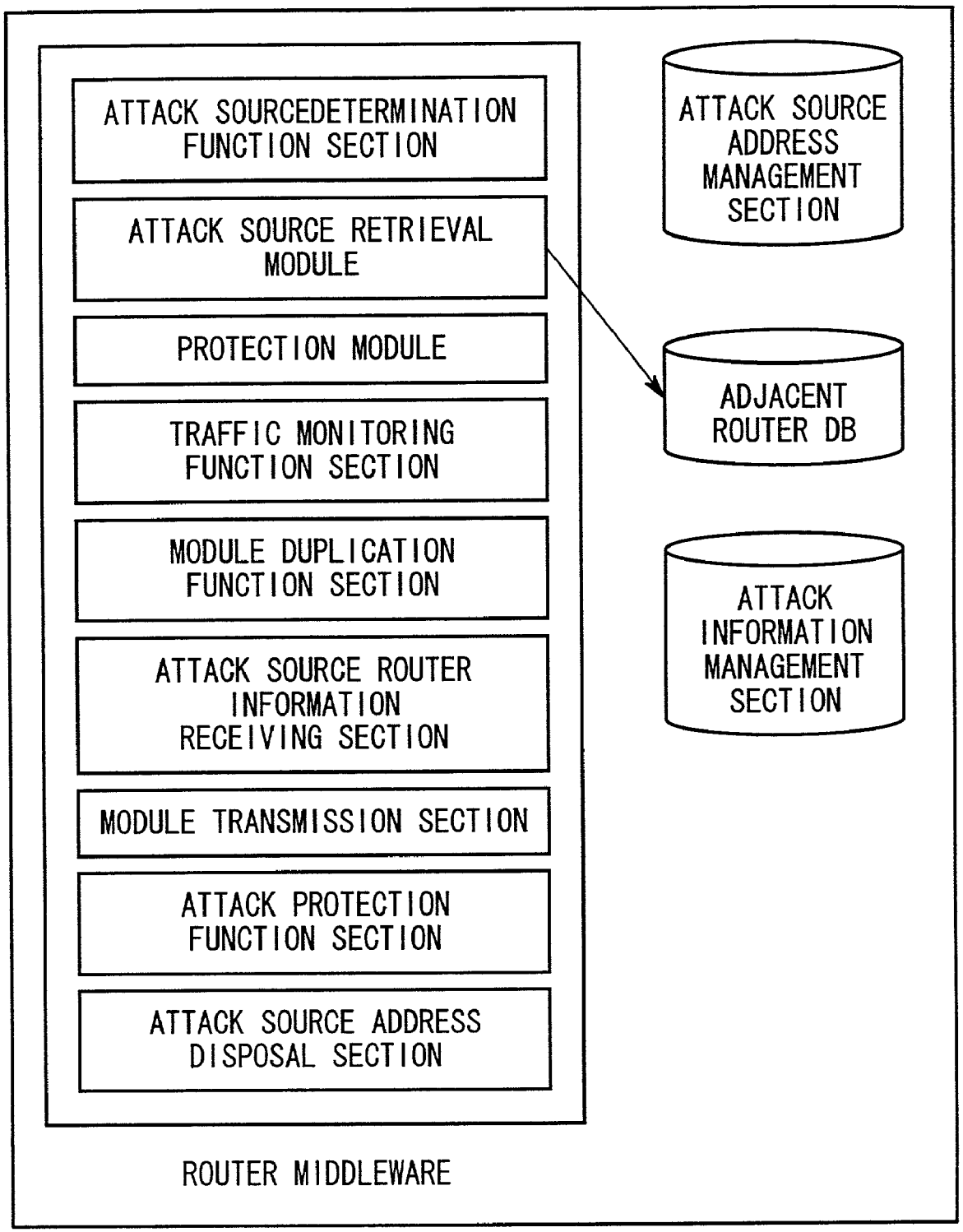
FIG. 10 is a structural diagram showing the functional structure for defending against DDoS attacks according to the first embodiment of the present invention.

FIG. 10 is a structural diagram showing the functional structure for defending against DDoS attacks according to the present embodiment. As is shown in FIG. 10, each of the functions for achieving the present invention operates in the router middleware environment. Note that the router middleware environment is an environment in which the operating system is provided as a virtual machine. A separate description of each of the functions shown in FIG. 10 is given below.

The attack source determination function section has the function of extracting the router sending a protection module (mobile packet filtering module) from among the attack source candidates retrieved by the attack source retrieval module. This attack source determination function section performs the process of step SO 12 shown in FIG. 4.

The attack source retrieval module is a program module that is sent to other routers in order to retrieve the address of the router closest to the attack source. This attack source retrieval module performs the process shown in FIGS. 5 and 6.

The protection module (mobile packet filtering module) is a program module that is sent to routers close to the attack source in order to halt the attack. The protection module performs the process shown in FIG. 8.

The attack source router information receiving section has the function of receiving information of the attack source router that is a retrieval result from the attack source retrieval module operating on the upstream router. This attack source router information is the information that is sent from the upstream router in the process of step S114 in FIG. 6.

The attack source address management section has the function of saving and managing addresses received from the attack source retrieval module by the attack source router information receiving section, in other words, addresses of the routers that are the destination of the protection modules.

The attack information management section has the function of managing the information about a DDoS attack.

The traffic monitoring function section has the function of monitoring the traffic passing through the router and detecting DDoS attacks. This traffic monitoring function section performs the determinations of steps S002 and S007 shown in FIG. 3.

The module duplication function section has the function of duplicating the attack source retrieval modules and the protection modules.

The adjacent router database is a database in which is stored information on routers in which the present invention has been applied and that are adjacent to the relevant router on the network topology.

The module transmission section has the function of transmitting the attack source retrieval modules and the protection modules to other routers.

The attack protection function section has the function of destroying attack packets.

The attack source address disposal section has the function of arranging address information relating to the optimum defense positions received from the upstream router. In other words, the attack source address disposal section performs process to dispose of redundancies in addresses such as is shown in FIG. 7.

Figure 11:
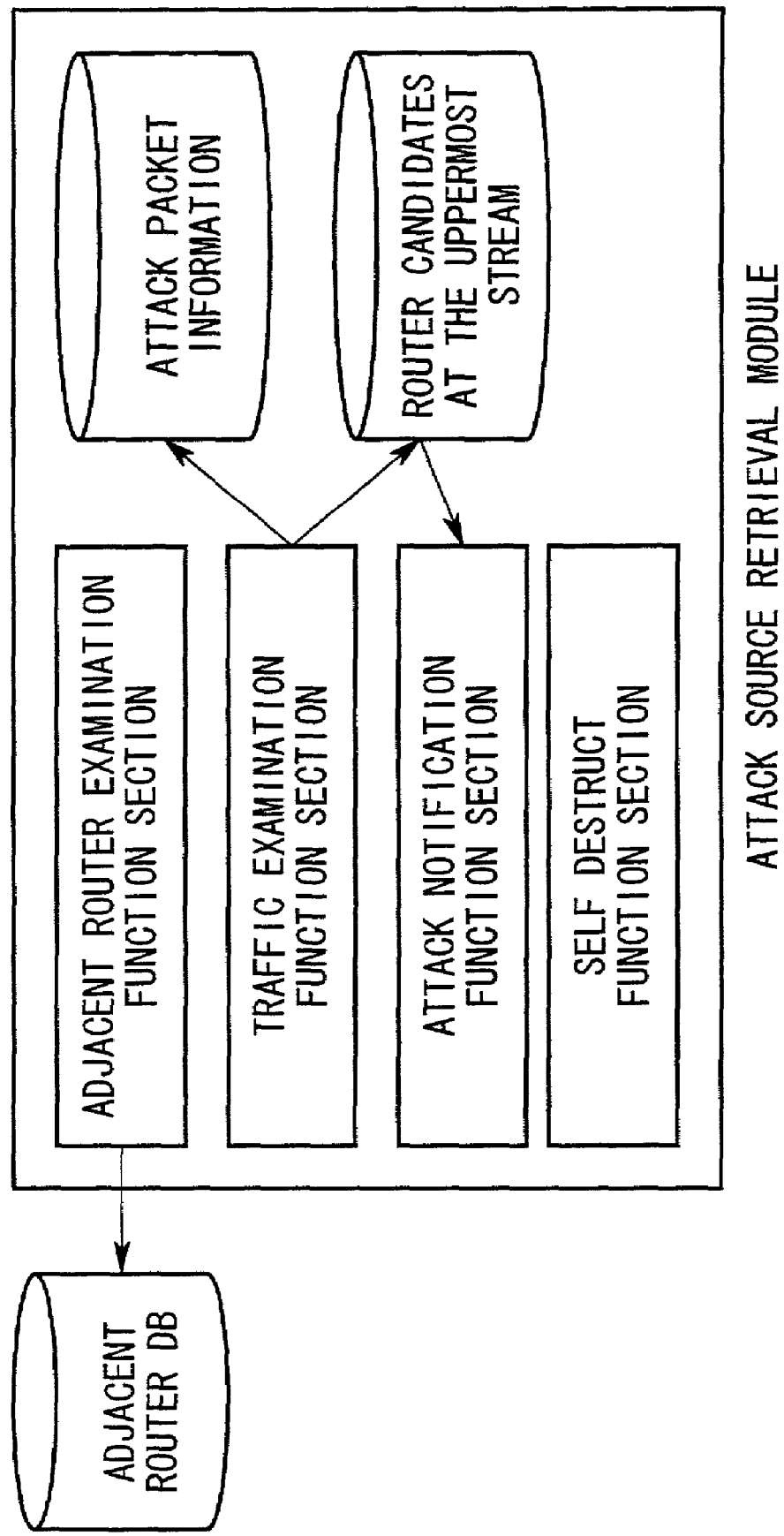
FIG. 11 is a structural view showing in detail the structure of attack source retrieval module according to the first embodiment of the present invention.

FIG. 11 is a structural view showing in further detail the structure of the attack source retrieval module. As is shown in FIG. 11, the attack source retrieval module is provided with an adjacent router examination function section, a traffic examination function section, an attack notification function section, and a self destruct function section and is able to hold attack packet information and information on the candidates of router at the uppermost stream.

The adjacent router examination function section has the function of extracting from the adjacent router database installed in the router subjects of examination as the upstream router.

The traffic examination function section has the function of comparing traffic passing through the router with attack packet information and of recording the upstream router as a candidate for router at the uppermost stream when an attack packet passing through the router is detected.

The attack notification function section has the function of making the addresses of the candidates of router at the uppermost stream known to the attack retrieval module of the duplicate original after the retrieval of the attack source has ended. It also has the function of making known the fact that no attack is being made if it finds that no attack is being made during the retrieval of the attack source.

The self destruct function section has the function of deleting the attack source retrieval module itself from the router when the attack source retrieval module is no longer necessary.

The attack packet information holds attack source candidates for the DDoS attack. The candidates of router at the uppermost stream hold information on the candidates of router at the uppermost stream of the attack source.

Figure 12:
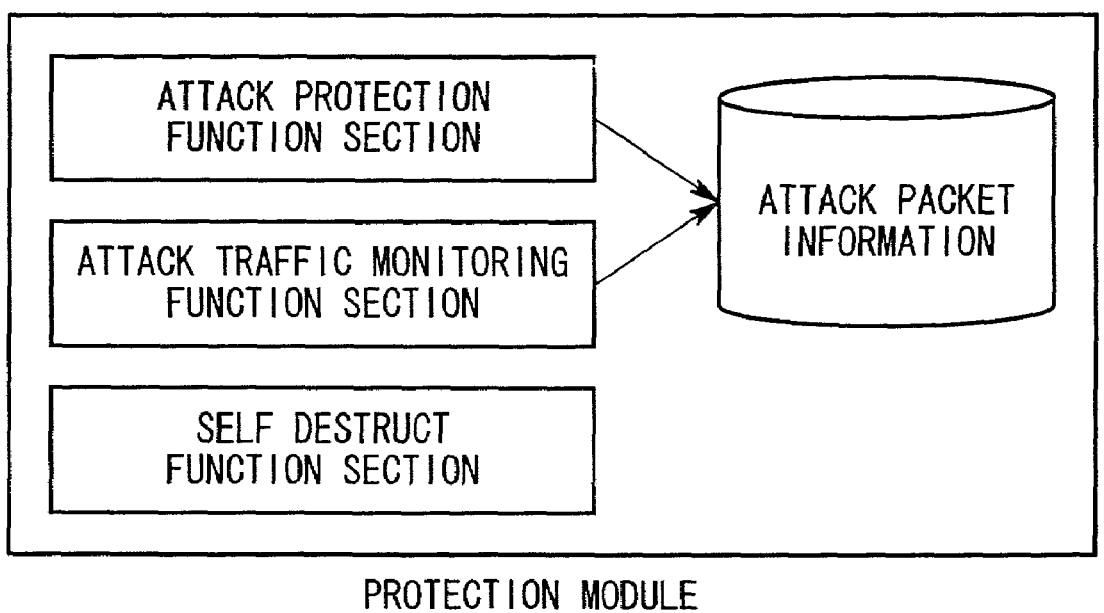
FIG. 12 is a structural view showing in detail the structure of protection module according to the first embodiment of the present invention.

FIG. 12 is a structural diagram showing in further detail the structure of the protection module. As is shown in FIG. 12, the protection module is provided with an attack protection function section, an attack traffic monitoring function section, and a self destruct function section, and is able to hold attack packet information.

The attack protection function section has the function of destroying attack packets. The attack traffic monitoring function section monitors whether or not an attack is continuing. The self destruct function section has the function of deleting the protection module itself from the router when the attack is terminated.

In summary of the above in order to aid understanding of the present embodiment: without the devices for performing packet filtering being limited to one router or router installation location, the packet filtering program is moved to any router present at an optimum location for protecting against a DDoS attack. In order to detect these optimum positions to which it may move, the packet filtering program uses an existing tracking technology such as the widely known Center Track technology and moves itself as a program towards the attack source of the DDoS attack.

In the present invention, a mechanism is included for creating duplicates of the packet filtering program and moving the duplicates to routers present in various locations. This mechanism is used to protect against a DDoS attack by causing the packet filtering to be performed at each attack source of a DDoS attack that is made from a plurality of locations simultaneously. In a system based on the present invention, the packet filtering function is installed firstly on a router located at the edge of the connection of a local area network that is being protected and the Internet. When a DDoS attack is detected, duplicates of the packet filtering function are moved to routers close to the plurality of respective attack sources of the DDoS attack. Because routers that are as close as possible to the attack source are sought as the destinations of this movement, the router that is located at the edge of the connection of the Internet and the local area network to which the attack source terminal is connected is the most effective, however, it is not absolutely necessary for the router to be one located at this edge.

Moreover, in the duplicated packet filtering function is also included the function of saving their own movement history and the histories of the filtered packets and sending these to the duplicate original.

Furthermore, in the duplicated packet filtering function is also included the function of deleting itself. This is an operation in which its own functions are deleted from the router when a particular fixed time has expired after the ending of the attack that the duplicated packet filtering was protecting against, or an operation in which the deletion is made in accordance with the policy of the routers in which the duplicated packet filtering is installed.

Thus, in accordance with the present embodiment, when protecting against a DDoS attack using packets whose source address has been spoofed, it is possible to provide a device and method for protecting against a distributed denial of service attack that are able to provide protection against the attack regardless of whether or not the source address is spoofed.

(Second Embodiment)

Next, a description will be given of the second embodiment of the present invention. In the above described first embodiment, the attack source retrieval module moves while holding all the attack information, however, in the second embodiment, the attack source retrieval module moves while holding the information of only one attack source.

Figure 13:
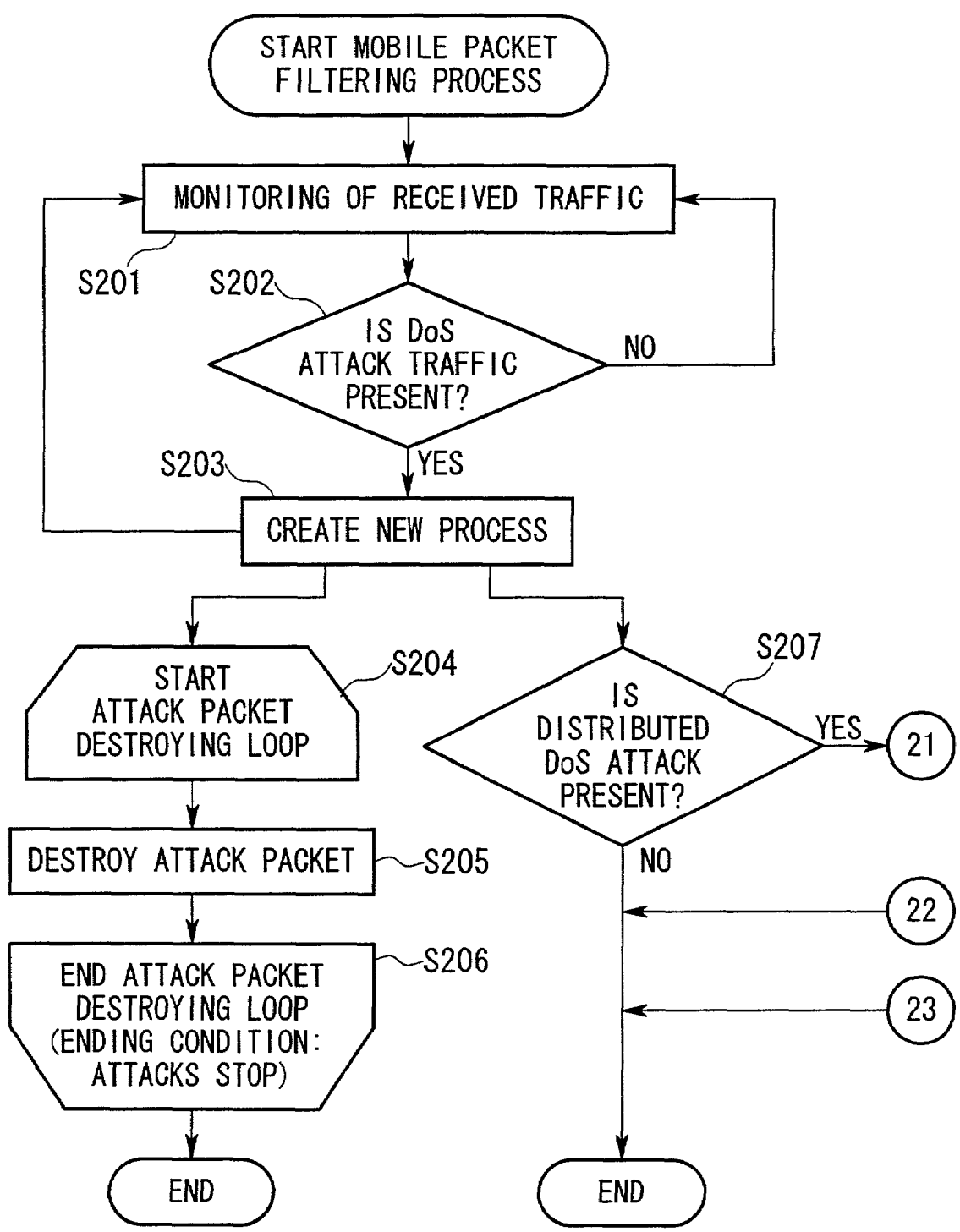
FIG. 13 is a partial view of a flow chart showing the procedure for a mobile packet filtering process according to the second embodiment of the present invention.
Figure 14:
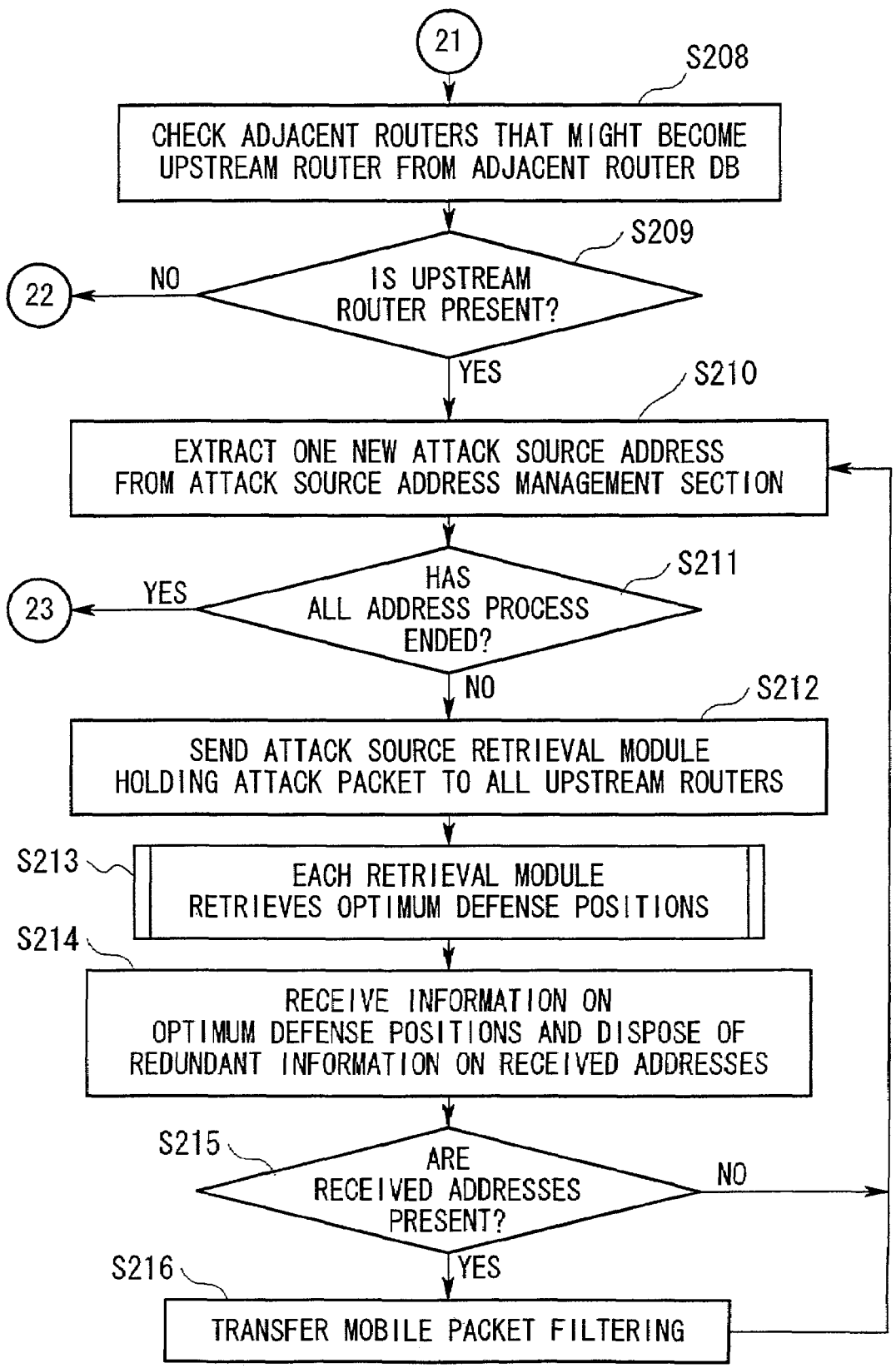
FIG. 14 is a partial view of a flow chart showing the procedure for a mobile packet filtering process according to the second embodiment of the present invention.

FIGS. 13 and 14 are flow charts showing the procedure of the mobile packet filtering process according to the present embodiment. The description below is given in accordance with these flow charts.

The process from steps S201 to S203 in FIG. 13 is the same as the process from step S001 to S003 shown in FIG. 3. The process from step S204 to S206 and the process of step S207 are also the same as the process from step S004 to S006 and the process of step S007 shown in FIG. 3 respectively.

Figure 4:
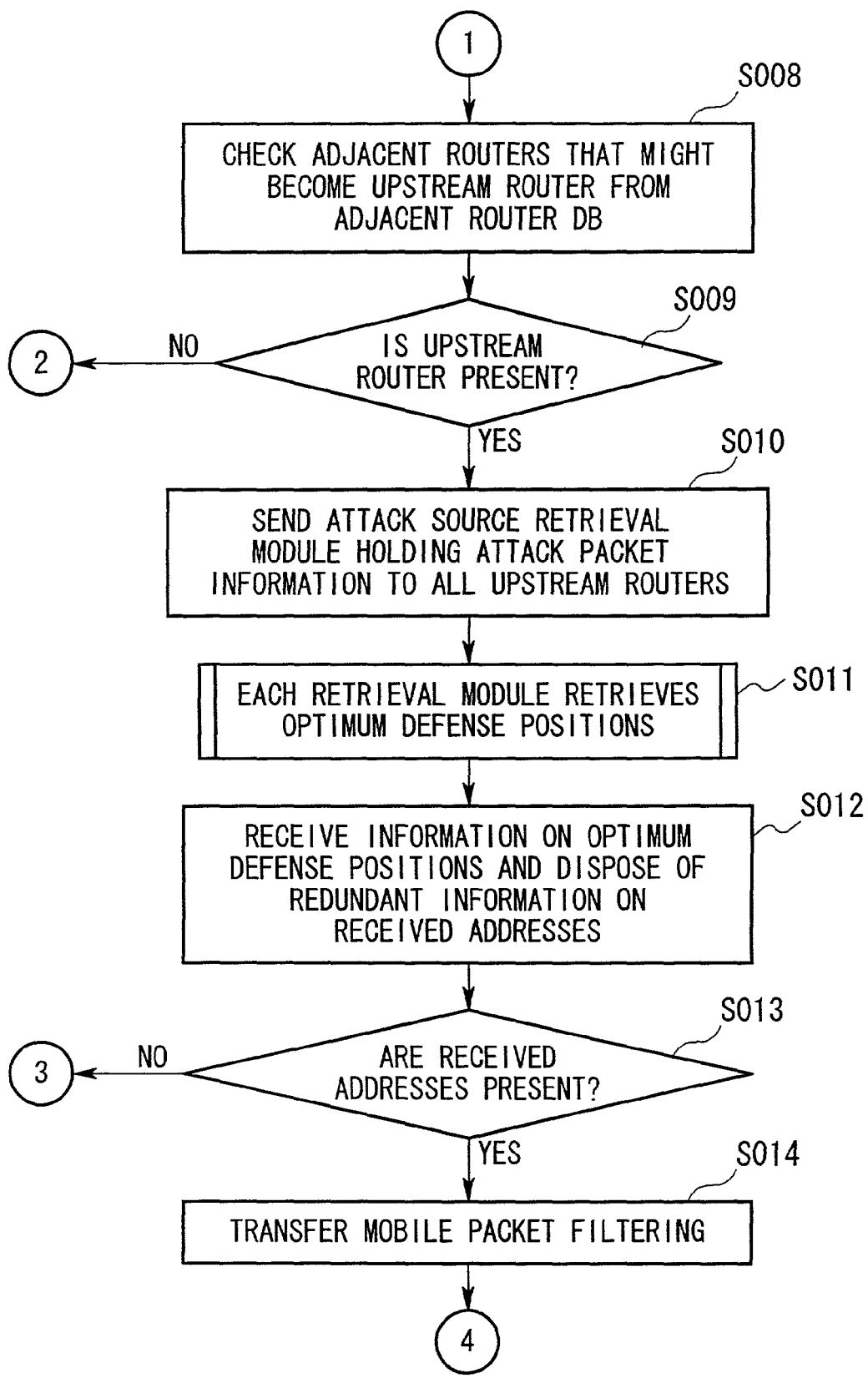
FIG. 4 is a partial view of a flow chart showing the procedure for a mobile packet filtering process according to the first embodiment of the present invention.

The process from step S208 to S209 in FIG. 14 is the same as the process of step S008 to S009 shown in FIG. 4. In step S210, the address of one new attack source is extracted from the attack source address management section. In step S211, the overall process is ended at the point when it is determined that all the address process has ended. In steps S212 to S216, the same process as that of step S010 to S014 shown in FIG. 4 is performed on the attack source addresses extracted in step S210. Next, the routine returns to step S210 and the next attack source address process is extracted.

Note that, in the second embodiment, the procedures for the process of the protection module and the attack source retrieval module sent to the upstream router are the same as those in the above described first embodiment.

(Third Embodiment)

Next a description will be given of the third embodiment of the present invention. In the first and second embodiments, the attack source retrieval module and the protection module are separate modules, however, in the third embodiment, a module (referred to below for reasons of convenience as "protection module B") is used in which the functions of the attack source retrieval module and the functions of the protection module have been integrated.

Figure 15:
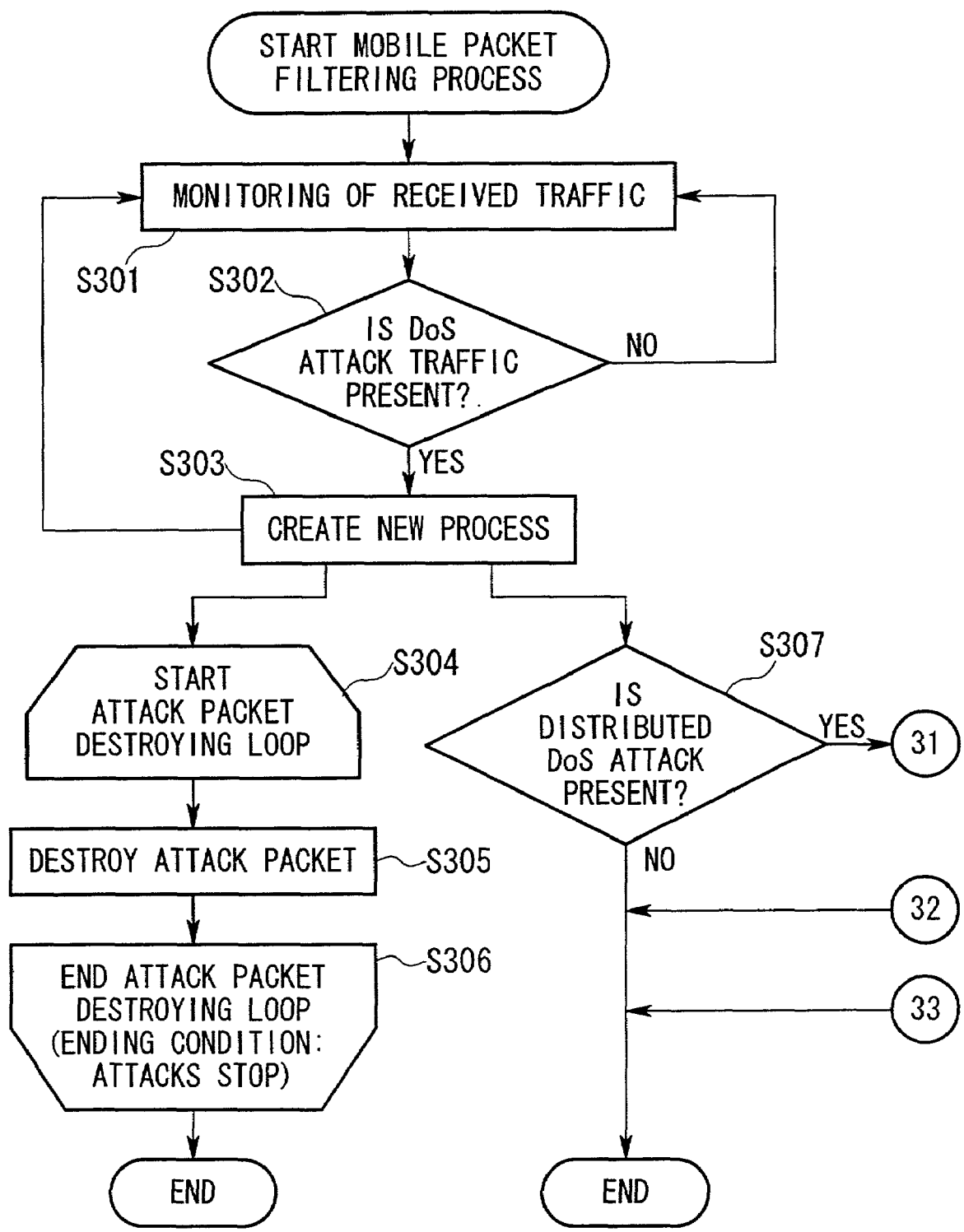
FIG. 15 is a partial view of a flow chart showing the procedure for a mobile packet filtering process according to the third embodiment of the present invention.
Figure 16:
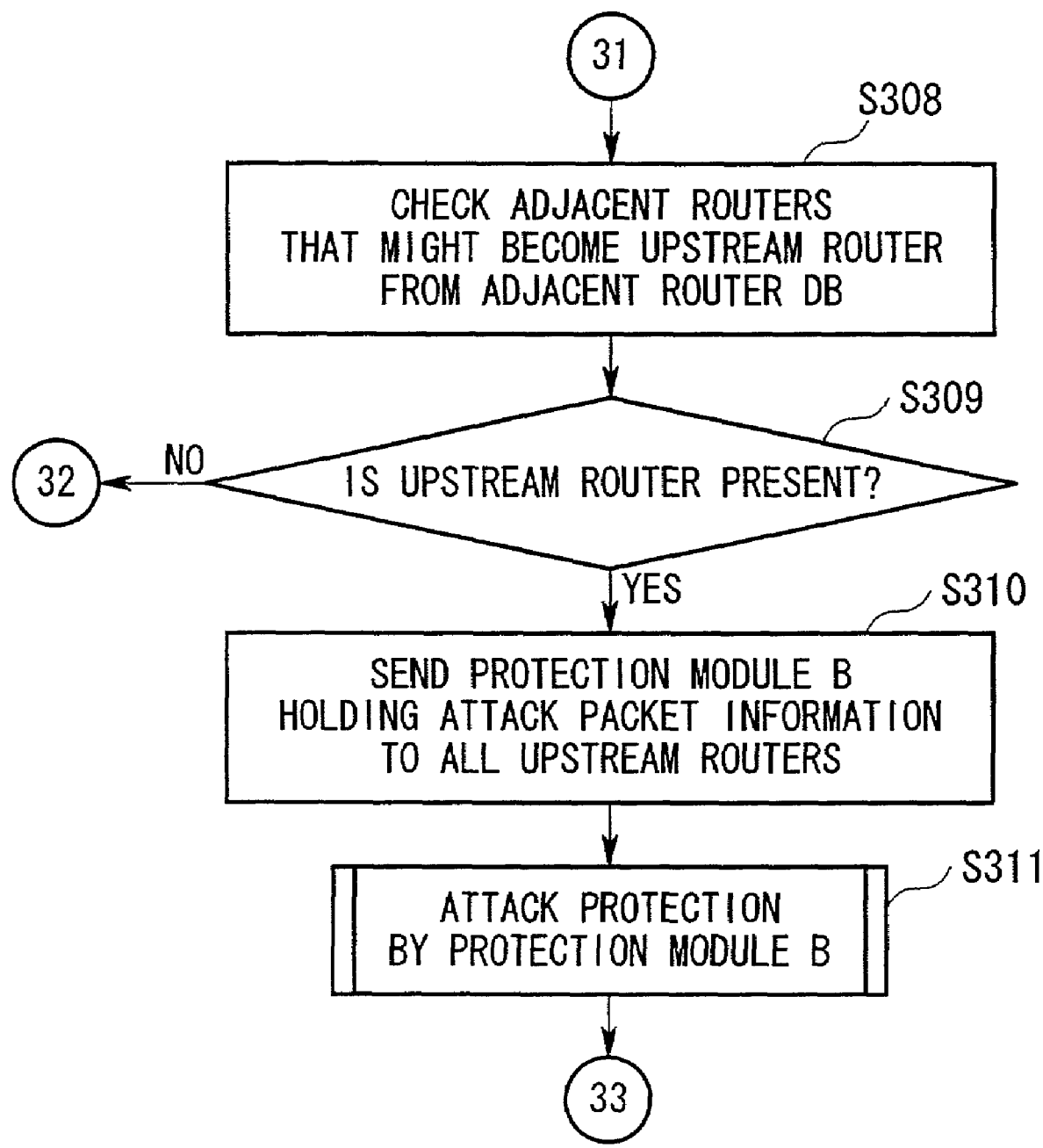
FIG. 16 is a partial view of a flow chart showing the procedure for a mobile packet filtering process according to the third embodiment of the present invention.

FIGS. 15 and 16 are flow charts showing the procedure for the mobile packet filtering process according to the present embodiment. The description below is given in accordance with these flow charts.

The process from steps S301 to S303 in FIG. 15 is the same as the process from step S001 to S003 shown in FIG. 3. The process from step S304 to S306 and the process of step S307 are also the same as the process from step S004 to S006 and the process of step S007 shown in FIG. 3 respectively.

The process from step S308 to S309 in FIG. 16 is the same as the process of step S008 to S009 shown in FIG. 4. In step S310, the protection module B holding attack packet information is sent to all upstream routers obtained in step S309. In step S311, the process of the protection module B is executed in those upstream routers to which the module has been sent. Namely, the attack protection is performed in the upstream routers, the retrieval of routers at upper stream is performed, and the relevant module is sent recursively to the routers at upper stream.

Figure 17:
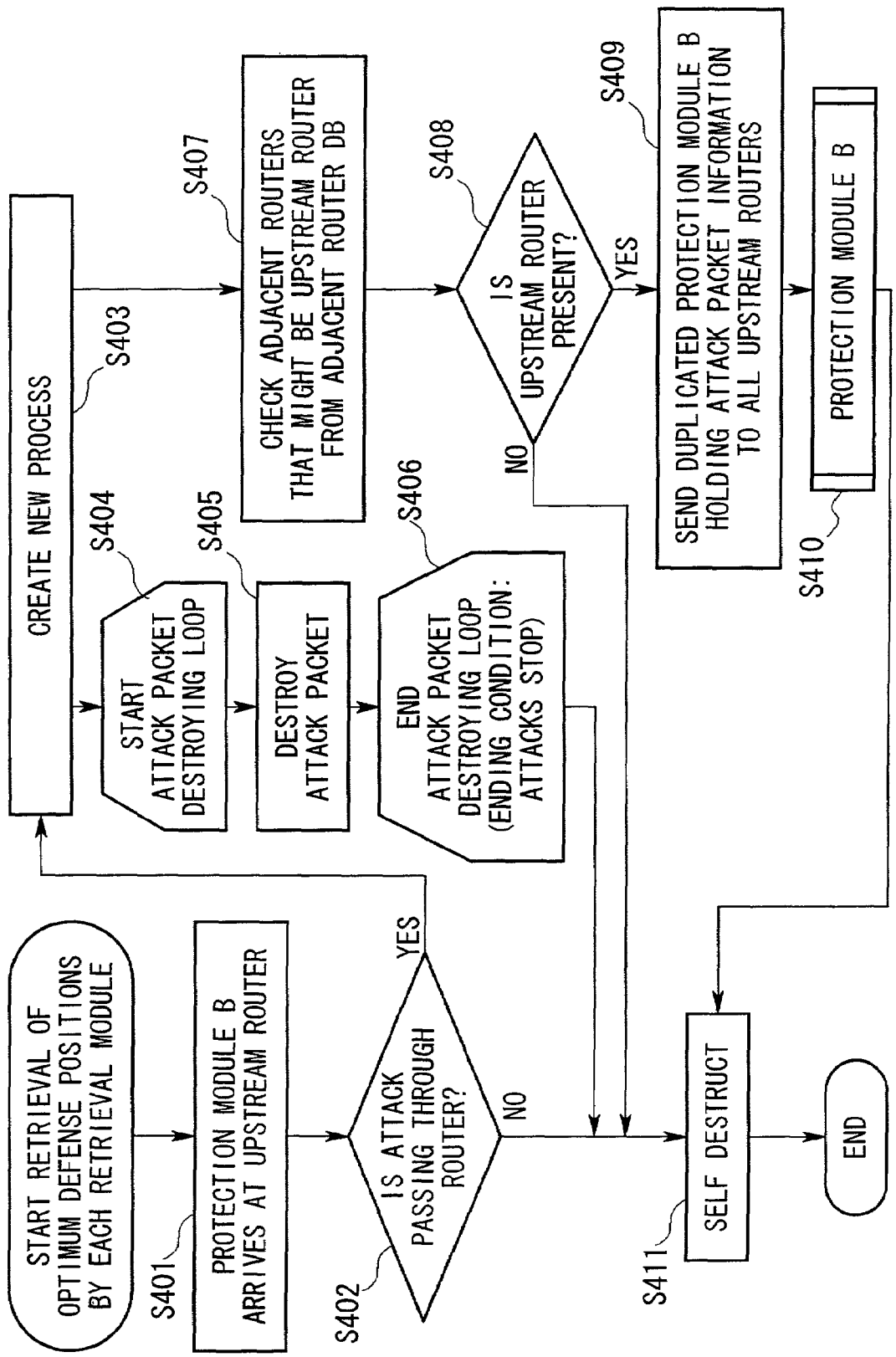
FIG. 17 is a flow chart showing the procedure for the protection module B process according to the third embodiment of the present invention.

FIG. 17 is a flow chart showing the procedure of the process of the protection module B according to the present embodiment. The description below is given in accordance with this flow chart.

In step S401 in FIG. 17, the transmitted protection module B arrives at an upstream router. In step S402, using the attack packet information held by the protection module B, it is detected whether or not an attack packet is passing through that router. If it is found that an attack packet is passing through the router in accordance with the result of this detection, the routine moves to step S403. If it is found that an attack packet is not passing through the router in accordance with the result of this detection, then in step S411, the protection module B deletes itself from the router and the process is ended.

In step S403, a new process is created. It is possible for the destroying of the attack packet and the retrieval of the upstream router to proceed in parallel with each other.

In steps S404 to S406, the first process that forked in step S403 destroys the attack packets until the attack stops, then deletes its own process and ends the process. Note that the process of steps S404 to S406 is the same as the process of steps S004 to S006 shown in FIG. 3.

The second process that forked in step S403 performs the process of steps S407 to S410. Note that the process of steps S407 to S410 is the same as the process of steps S308 to S311 shown in FIG. 16. Thereafter, in step S411, the second process deletes its own process and ends the process.

Namely, the protection module B recursively retrieves an upstream router, sends the protection module B itself to that upstream router, and then further performs the process of the protection module B in the upstream router to which it has been sent. This recursion is terminated in the router closest to the attack source at the uppermost stream and the destruction of the attack packets is continued in this router at the uppermost stream until the attack is stopped.

Figure 18:
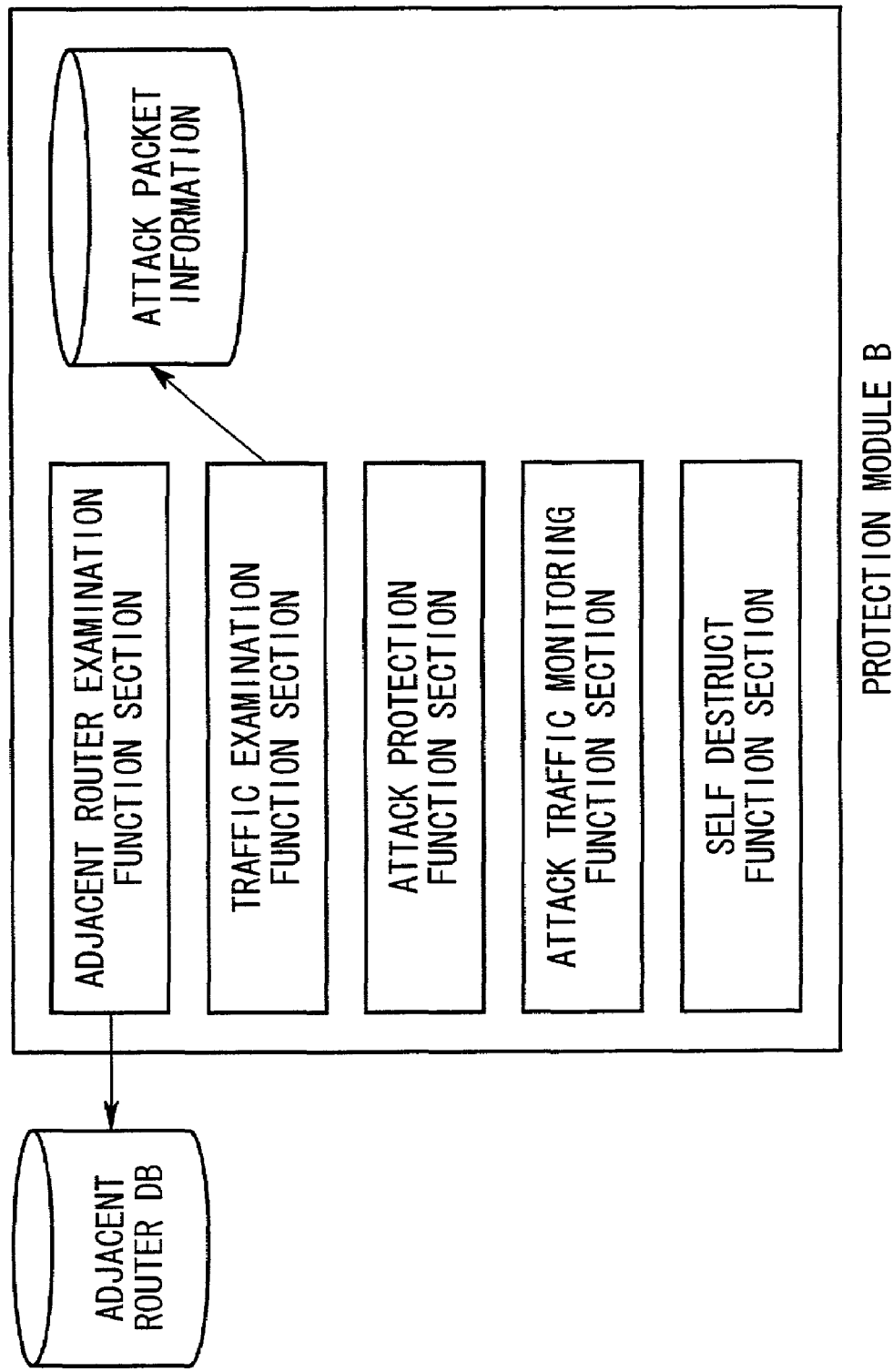
FIG. 18 is a structural view showing the structure of the protection module B according to the third embodiment of the present invention.

FIG. 18 is a structural view showing the structure of the protection module B having both the attack source retrieval function and the attack protection function. As is shown in FIG. 18, the protection module B is provided with an adjacent router examination function section, a traffic examination function section, an attack protection function section, an attack traffic monitoring function section, and a self destruct function section and is able to store attack packet information.

Among these, the adjacent router examination function section, the traffic examination function section, and the self destruct function section are the same as the respective function sections having the same name shown in FIG. 11 in the structure of the attack source retrieval module in the first embodiment. In the same way, the attack protection function section is the same as the attack protection function section shown in FIG. 12.

(Method of Executing each Function on a Network Relay Node (Router))

In the above described first through third embodiments, it has been assumed that program modules can be transferred from router to router, the program module can be executed in the receiving router, and the process of the communication data passing through the relay node can be performed. Here, a description is given of the method of transferring and executing this type of program module.

In recent years, as use of the Internet has expanded in various directions, it is already no longer possible to respond to the various needs of users simply by the transferring of packets by network nodes. Moreover, the manufacturers of various types of network devices have achieved new services such as multicast and RSVP (Resource Reservation Protocol), for example, by upgrading firmware of network device.

In contrast, what is known as active network technology aims at making the rapid development of new network services possible by providing an environment for executing programs in the network relay node, and by executing standardized function modules on that executing environment. In a conventional network it is almost impossible for a communication terminal to specify any options other than the source address or destination address of an IP packet, however, in this active network it is possible to specify what type of process a packet sent from a source communication terminal will perform before the packet arrives at the destination communication terminal. The methods of an active network can be separated into the three types given below.

Firstly, there is the active packet method. This active packet method is one in which a small scale program is embedded in the packet. This program is extracted and executed in a relay node. The second is the active node method. This active node method is a method in which a program is installed in advance in a relay node. By adding an ID identifying a previously defined service to the packet, the program executed in the relay node is specified. The third is the active packet node method which is a combination of the first and second types and which combines the advantages of both types. It is desired that these three types of format use a new header format such as the ANEP (Active Network Encapsulation Protocol) header.

The aforementioned multicast and RSVP new services are realized by upgrading the firmware of the network devices, however, these methods have the problems of the costs piling up, a long time being needed for development of the service, and software needing to be developed for each different item of hardware.

Moreover, the aforementioned three active network methods each require that before a packet is sent from a data sending terminal, information be added thereto for giving instructions about the performing of process on the transmitted data that has not been present in a conventional IP packet, such as the embedding of a program in the packet or the adding thereto of a previously defined service ID. In order to achieve these, process is performed to add information to the packet by means of, for example, a processing program for the IP packet or an application in the terminal sending the data. Therefore, the problem exists that it is necessary to alter the IP packet processing program and the application on the communication terminal, which inevitably causes cost to increase.

In the present invention, in order for the service module to be able to move without being restricted by the type of the relay node, and for the service module installed on the relay node to be used, means such as are described below are provided that enable a program to be operated on a network communication device without there being a need for the software installed on the communication terminal (e.g. a computer) to be altered.

Namely, the network communication device used in the present invention comprises: platform means for dynamically installing a program on a relay node provided on a network; means for providing an application interface for the installed program; means for delivering a packet to the program if the packet sent to the relay node is subject to the process by the program when the program is in operation; and means for sending out the packet when the process is completed.

A description will now be given of the technology for operating a program using this network communication device using an even more detailed implementation method using the drawings.

Figure 19:
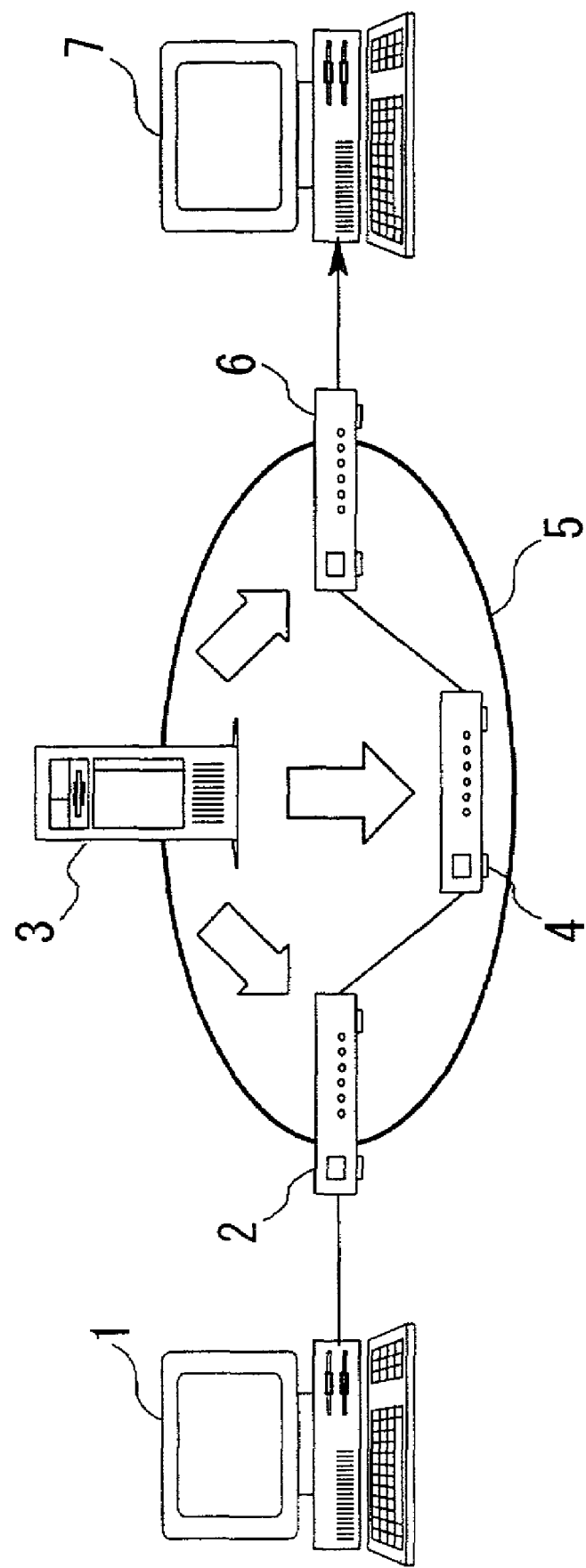
FIG. 19 is a structural view showing the schematic structure of a system for operating a program on the network communication device to which the present invention is applied.

FIG. 19 is a structural diagram showing the schematic structure of the system. As is shown in FIG. 19, communication terminals 1 and 7 are connected by a communication network 5, and are also connected by network relay nodes 2, 4, and 6 in which the three different functions of a router, an ATM (Asynchronous Transfer Mode) switch, and a computer having the ability to transfer IP packets have been integrated. A module server 3 receives new modules that are sent from a service module developer (not illustrated) and authenticates the developer using an electronic signature that is sent together with the module. The hardware system and system software (the platform) used by the computer system is arranged in this manner.

Figure 20:
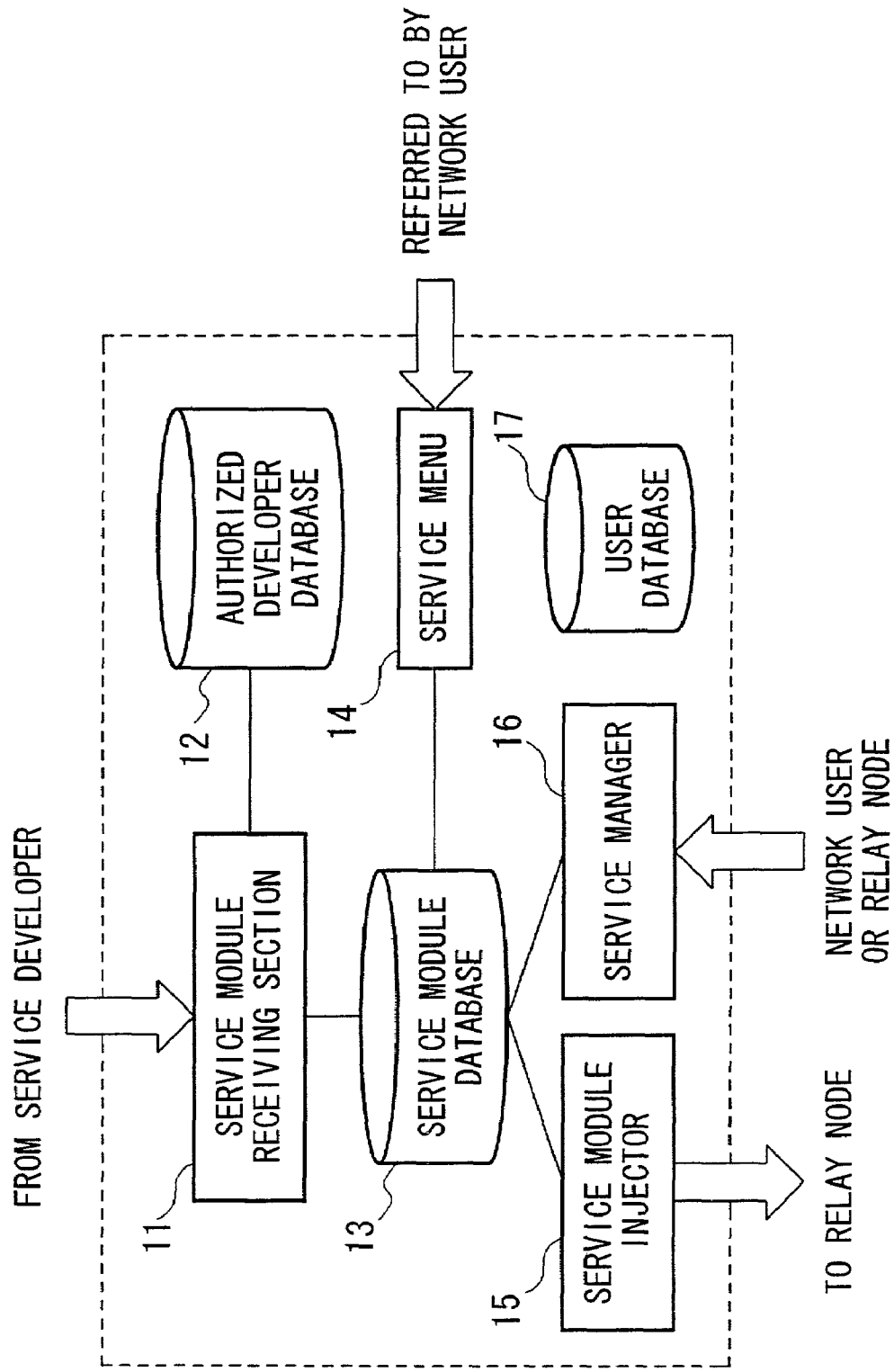
FIG. 20 is a structural diagram showing the structure of a module server.

Next, FIG. 20 is a structural view showing the structure of the aforementioned module server 3. A service module receiving section 11 authenticates a developer by examining the electronic signature that was added to the received service module using information registered in advance in the authorized developer database 12. The service module receiving section 11 examines whether the received service module meets the request conditions for interfaces and security. Thereafter, modules that have been examined are stored in the service module database 13. The name of the saved service modules and an outline of the services thereof are displayed on a service menu 14. This private service menu 14 can be viewed by network users via the network so that end users view the menu contents and then request a service. When the request is received, the contents of the user database 17 are examined and, if confirmation is made that the network user sending the request has the authority to make the request, the service module injector 15 transfers the service module requested by the network user to the network relay node. At this time, the service manager 16 records the destination of the service module transfer and thereafter, if the service module is moved to another relay node, receives information about the destination of this movement from the service module. The service manager also receives and manages information from the service concerning the state of the service module such as whether or not it is in operation.

Figures 21, 22:
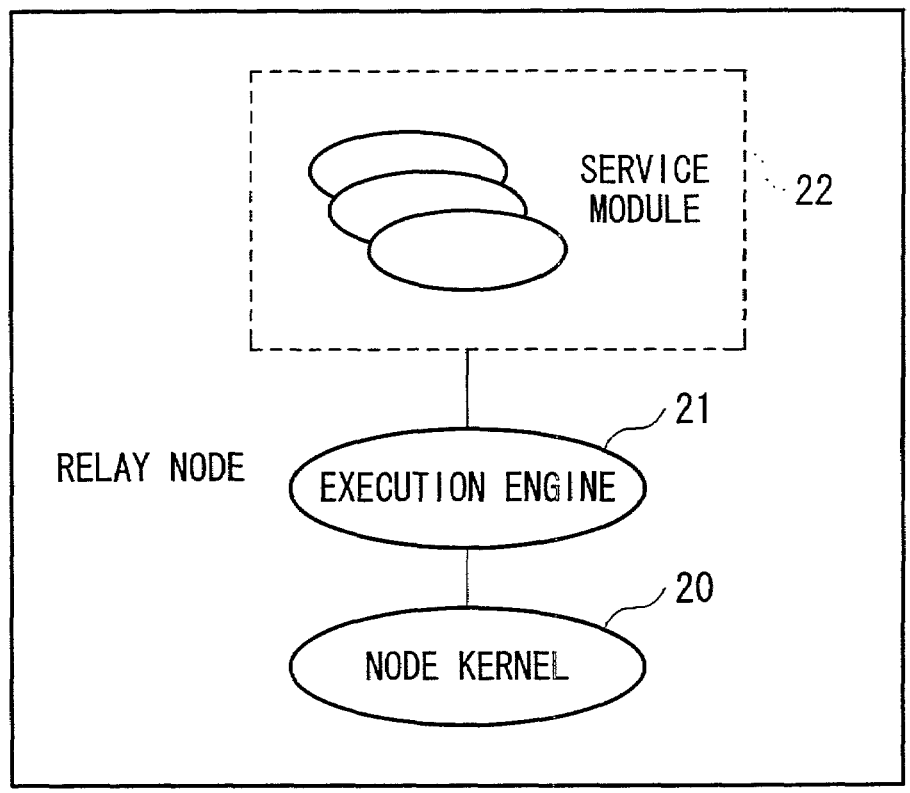
FIG. 21 is a schematic view showing the outline of a network relay node (router).
FIG. 22 is a table view showing the functions of an execution engine and node kernel inside the relay node.

Next, FIG. 21 represents an outline of the network relay node (router) in which the present invention has been installed. FIG. 22 is a table showing the functions of an execution engine and node kernel inside the relay node. Note that this node kernel and execution engine are functions forming the OS shown in FIG. 9.

As is shown in FIG. 21, the node kernel 20 provides an interface for the process of the relay mode that is different for each maker such as startup/shutdown of the system installed in the relay node, the management of the input and output between the system and the devices installed in the relay node, the packet filtering, the management of the traffic data schedule, socket process, and routing table operations, and the like. When a request is made by the execution engine 21 and the service module 22 to the node kernel 20 for process such as the packet filtering, the node kernel 20 acts as an intermediary for that process. In addition, when an IP packet is transferred to the relay node, if this packet is one needing to be processed by the service module 22 installed on the relay node, the node kernel 20 allocates the packet to the service module 22 via the execution engine 21. If the packet is not one needing to be processed by the service module 22 installed on the relay node, the packet is processed in that state as a normal IP packet and then transferred. At this time, the information on what packet is to be processed is sent together with the service module 22 from the module server 3 (see FIG. 19).

The execution engine 21 is constantly on standby for a new service module 22 to arrive from the module server 3 and monitors the state of the process when the service module 22 starts process. If necessary, the execution engine 21 sends information on that state to the module server 3.

Figure 23:
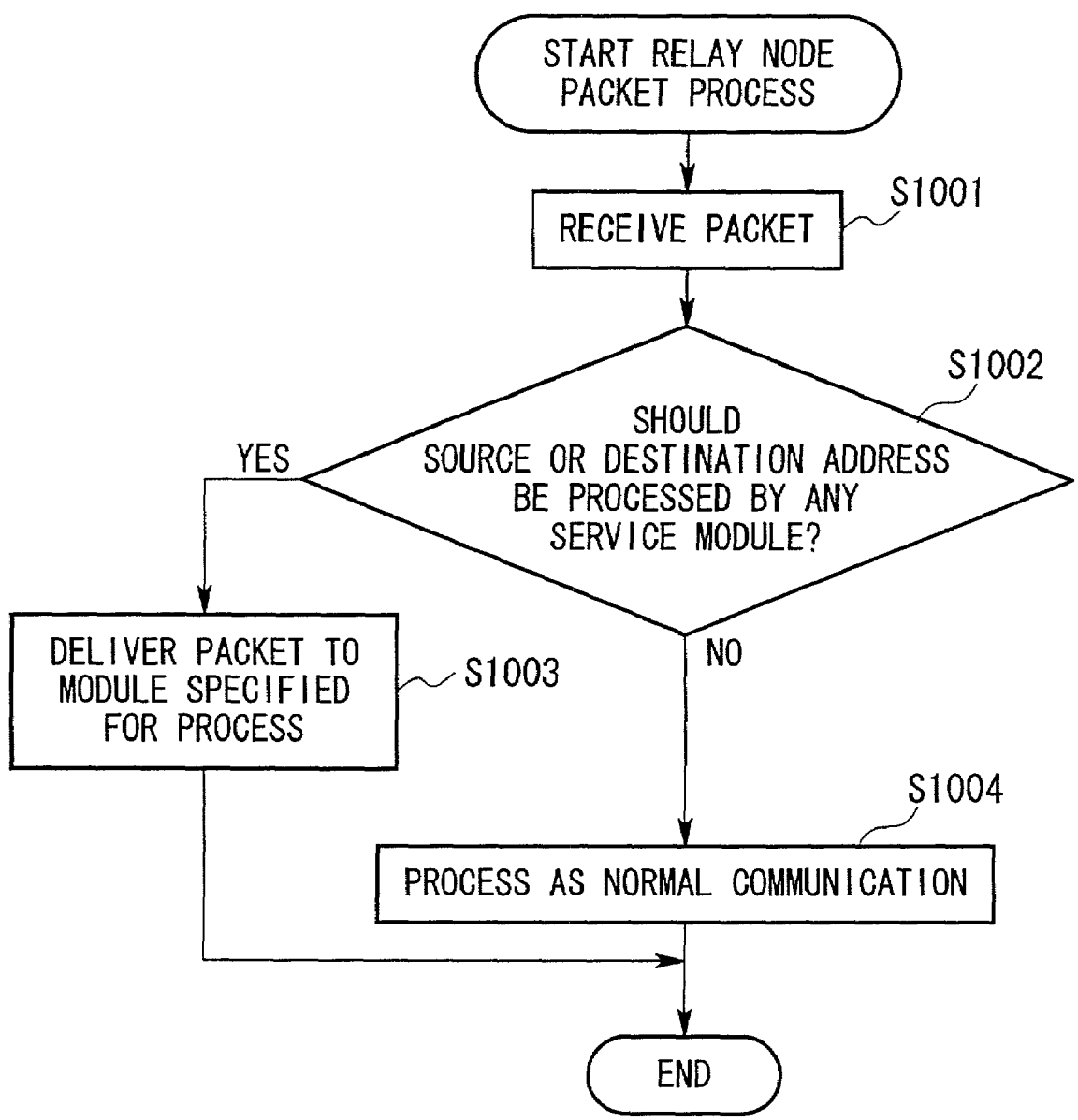
FIG. 23 is a flow chart showing the procedure for processing a packet received by the relay node.

Next, FIG. 23 is a flow chart showing the way in which a packet received by the relay node is processed on the basis of the present invention. Firstly, in step S1001, a particular relay node receives an IP packet from an adjacent relay node or the like. Next, the routine moves to step S1002 where a check is made as to whether or not the destination address or source address of the received packet should undergo the process of one of the service modules installed on the relay mode. If the source address or destination address is specified as an address that should undergo the process of the service module, the routine moves to step S1003 where the packet is delivered to the service module 22 (see FIG. 21) specified to perform the process and that service module 22 performs the process. If the packet is not specified as one that should undergo process, the routine moves to step S1004 where transfer process is performed while referring to a routing table and the like such that the IP packet arrives at the destination address as a normal IP packet. Note that the determination conditions of step S1002 are shown as hinging on the source address or the destination address of the IP packet, however, the conditions are not limited to these and it is possible for the source module 22 to set its conditions freely.

Figure 24:
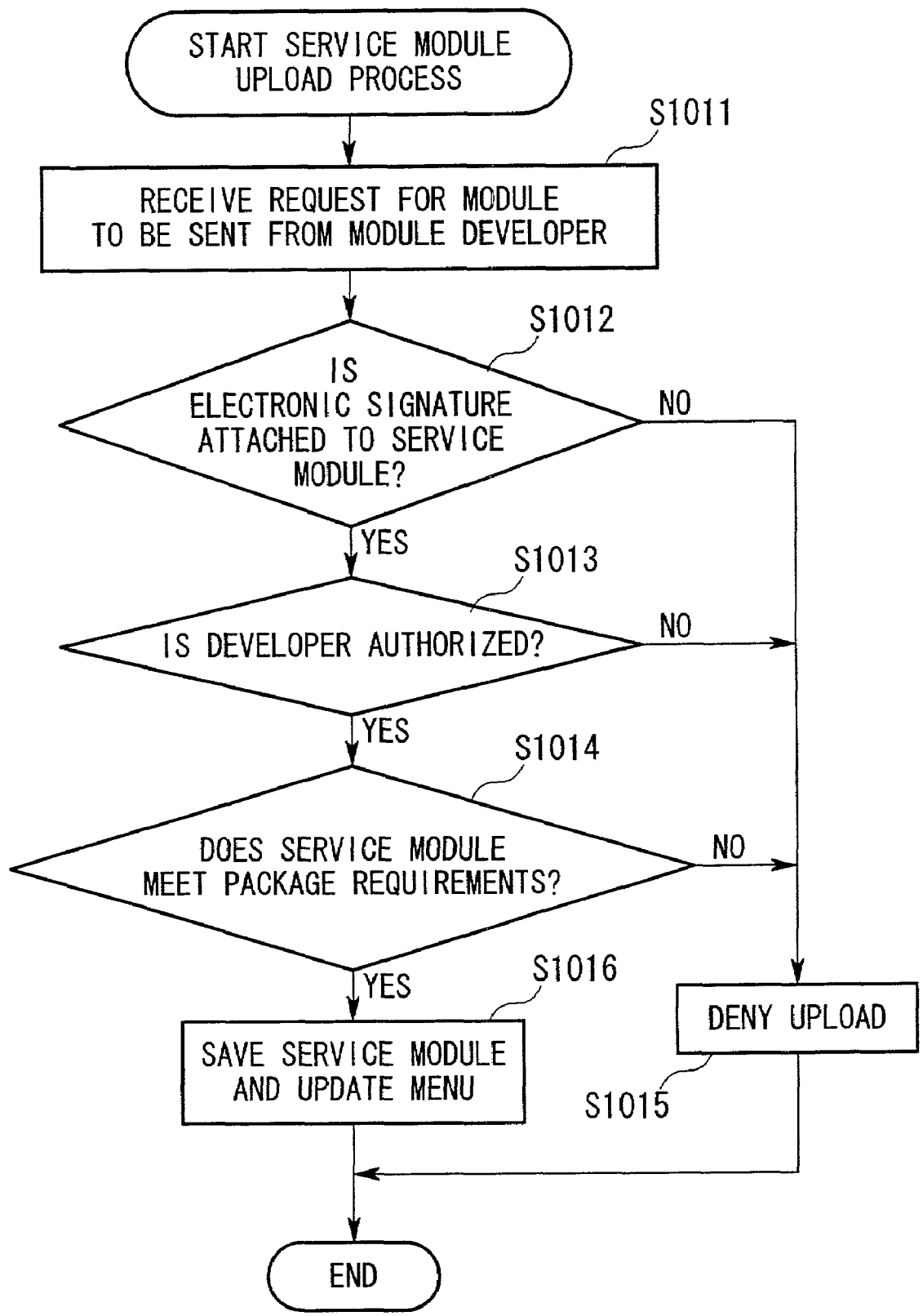
FIG. 24 is a flow chart showing the procedure for sending a service module to a module server.

Next, FIG. 24 is a flow chart showing the procedure for sending the service module 22 (see FIG. 21) to the module server 3 (see FIG. 19). Firstly, in step S1011, a request from a developer of the service module 22 for a service module 22 to be sent is received together with the service module 22 program and the electronic signature of the developer. Next, the routine moves to step S1012 where a check is made as to whether or not the electronic signature is attached. If it is attached, the routine moves to step S1013 where a check is made as to whether or not the developer has been previously registered. If the developer has been previously registered, the routine moves to step S1014 where a check is made as to whether or not the program of the service module 22 meets the request conditions. If any one of the conditions of steps S1012, S1013, and S1014 are not met, the routine moves to step S1015 where the reception of the service module 22 is denied and the process is ended. If all the conditions are met, the routine moves to step S1016 where the service module 22 is registered in the database and the contents of the service menu are updated.

Figure 25:
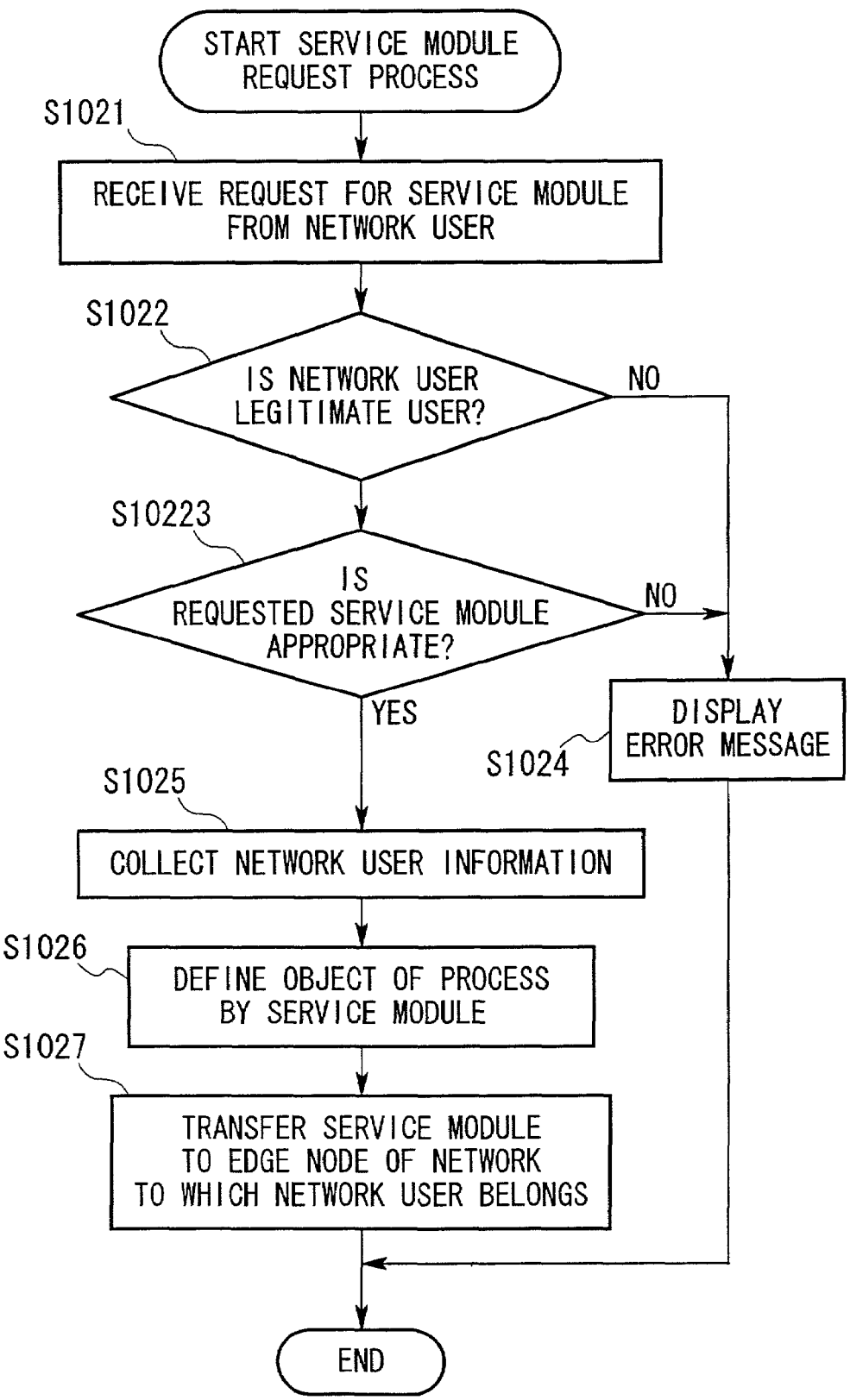
FIG. 25 is a flow chart showing the procedure when receiving a service module request from a network user.

Next, FIG. 25 is a flow chart showing the procedure when a request for a service module is received from a network user. Firstly, in step S1021, a request for the service module 22 (see FIG. 21) is received from a network user. The routine then moves to step S1022 where it is confirmed whether or not the network user sending the request is a legitimate user based on the information of the network user that was sent together with the request. If the user is a legitimate user, the routine moves to step S1023 where an examination of the legitimacy of the service module 22 requested by the network user is made such as whether the service module 22 contained in the request received from the network user is stored in the module server 3 (see FIG. 19) and whether the service module 22 is one for which the network user has the authority to make a request. If one of the conditions is not met in either step S1022 or step S1023, the routine moves to step S1024 where an error message is displayed and the routine is ended.

Next, the routine moves to step S1025 where information on the network user is collected from the user database stored in the module server 3. Continuing on to step S1026, packets that can be processed by the requested service module 22 are defined from information relating to the network to which the network user who requested the service module 22 is connected that is contained in the user information. The routine then moves to step S1027 where the relay node situated at the edge where the network is connected to the Internet is derived from the information relating to the network to which the network user who requested the service module 22 is connected that was collected in step S1025. The service module 22 is then transferred to the relay node situated at the derived edge and the routine is ended.

Figure 26:
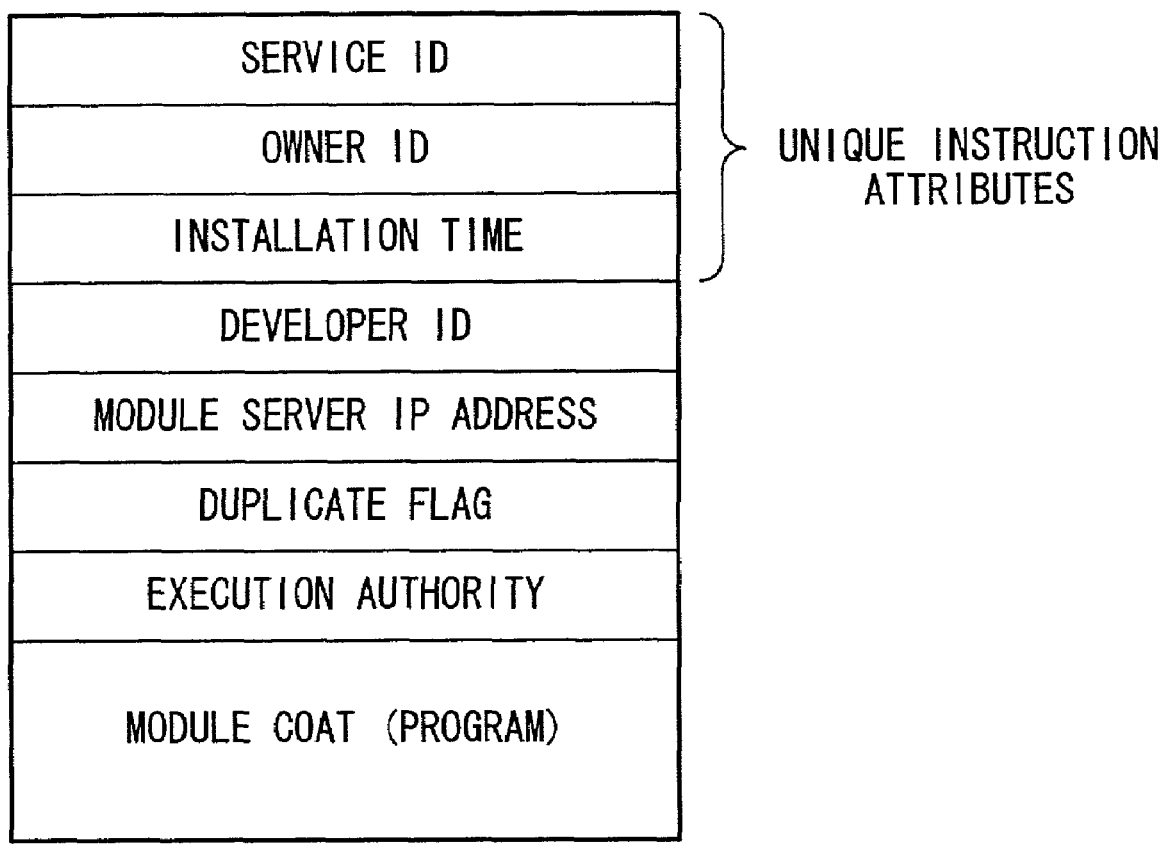
FIG. 26 is a schematic view showing the theoretical structure of a service module.

Next, FIG. 26 shows the theoretical structure of the service module 22. In order to control the behavior of the private service module, here, seven types of attribute are added before the service module 22 is installed in the relay node. These seven types of attribute comprise the service ID, owner ID, installation time, developer ID, module server IP address, duplicate information, and the object of the process. The duplicate information and the processing object are described in detail below.

The service module is able to move from the relay node in which it was originally installed and is able, in some cases, to form a plurality of copies of itself and carry out process at a plurality of relay nodes. In order to differentiate between the service modules duplicated in this way, the service module installed from the module server on the relay node is taken as the original and when duplicates other than this installed service original are created in other relay nodes, these are taken as the duplicated service modules and information distinguishing between each duplicate is saved as duplicate information in the service modules. The processing object is created when the network user requests a service module from the module server. Alternatively, the module server may check the user information database and packets that can be processed by the service modules may be determined by the IP addresses and the like. The factor here that allows a packet to be the object of the process is data showing that the source or destination is the end user who requested the service module and this factor can be identified using information other than the IP address.

The network user makes a request by selecting the service module from a menu. At this time, it is possible to send parameters specifying the initial state of the service module to the module server at the same time as the service ID specifying the requested service module. In this case, when the initial settings have ended, the service module is installed on the relay node. If no particular designation is made the node that is closest to the network to which the network user requesting the service module belongs is used for this relay node receiving the installation. When the service module is installed on the relay node, it is possible for the packet process, the moving to other relay nodes, the creation of duplicates, and the like to begin without waiting for other conditions to be met, however, the type of process that is performed depends on parameters specified as initial values by the network user and algorithms in the service module programmed by the developer of the service module.

The following restrictions relating to the execution are added for security reasons to the service module. The first involves restrictions on use. This restriction on use is the number of services that can be used at any particular time and can also be set so as to be deleted from the relay node immediately the service module ends the process. If the number of service modules in use reaches the limit then it is not possible to execute any further new services and the service module manager inside the module server monitors the number of services being used by all users.

The second involves the duplicate modules. The duplicate modules automatically become unable to exist when the original module ceases to exist. Moreover, if the original module ceases to exist, the duplicate modules are also deleted by the module server. In addition, if the duplicate models do not perform the process of the packet for a set time or longer, they are deleted by the execution engine. Namely, in order for the duplicate models to continue process, it is necessary for them to continue to receive packets.

The third involves the service modules. The service modules are only ended when the service module arrives at the ending conditions set for that service module itself, or when the network user who requested that service module explicitly transmits via the module server an instruction to end the use of that service module. These conditions apply for all service modules.

The fourth involves the packet to be processed. There is a limit on the packets that can be processed by the service module. The service module is only able to perform process on data for which the communication terminal belonging to the network to which the network user who requested that service module belongs is the source or destination.

The fifth involves competition between the objects to be processed. As stated above for the fourth restriction, there is a limit on the packets that can be processed by the service module, however, looking at one single packet, there is definitely a transmission source user and a transmission destination user. Therefore, it is possible that a service module from both the network user who is the transmission source and the network user who is the transmission destination of a transferred IP packet are installed in a particular relay node. At this time, a restriction is imposed to the effect that process can be performed on the packet only by the service module of the transmission destination.

The sixth involves competition between modules. If a plurality of service modules from the same network user are installed in a particular relay node, only the service module installed first is able to perform process on the IP packet.

The seventh involves the input and output of a packet. It is not possible for the service module itself to create a new IP packet. Namely, only one packet is transferred out for every one packet that is transferred in.

The eighth involves location management. Because it is possible for the service module to move between all relay nodes including the duplicate modules, when a move is made, the location of the new relay node is also made known to the module manager in the module server.

In this way, restrictions relating to the execution are added for security reasons to the service module.

By using the technology described above, there is provided an execution environment that provides program interfaces of different specifications in relay nodes manufactured by different companies to a service module in an integrated shape. As a result, if the relay node is one in which a service module can be installed, it is possible for the service module to move to a relay node without being restricted by the type of the relay node. Moreover, by using the method in which the object to be processed by the service module is specified in a conventional IP packet form, in the conventional technology of active networks and the like, there is no need for the packet itself to be changed as has previously been necessary. As a result, there is no need to alter the software installed on a communication terminal such as a computer in order to use a service module installed on a relay node.

Note that each of the aforementioned computer programs is recorded on a computer readable recording medium and a CPU (Central Processing Unit) installed in a communications device or the like reads the computer program from this recording medium and executes the respective process for attack protection or for providing a service module. By the term "computer readable recording medium" is meant a storage device such as a hard disk or the like built into the computer system or a portable medium such as a CD-ROM, ROM, a magneto optical disk, or a magnetic disk. Furthermore, the term "computer readable recording medium" may also include a medium that stores a program for a fixed time such as is the case with the volatile memory (RAM) inside a computer system forming the client and server when the program is transmitted via a network such as the Internet or a communication line such as a telephone line.

The above described program may also be transmitted from a computer system in which the program is contained in a storage device via a transmission medium or by the transmitted wave in a transmission medium to another computer system. Here, by the term "transmission medium", which transmits the program, is meant a medium having the function of transmitting information such as is the case with a network such as the Internet or a communication line such as a telephone line.

In addition, the above described program may be one for realizing a portion of the aforementioned functions. Furthermore, it may also be what is known as a "differential file" (differential program) that is able to realize these functions by being combined with programs already recorded on the computer system.

In the above specification, the embodiments of the present invention have been described in detail, however, the specific structure of the invention is not limited to these embodiments and any design that does not deviate from the intent of the present invention is included therein.

What is claimed is:

1. A communication device for defending against a distributed denial of service attack, comprising:
   a traffic monitoring function section that monitors communication packets passing through the communication device and detects distributed denial of service attacks;
   a protection module that destroys the distributed denial of service attack packets when the distributed denial of service attacks are detected;
   an attack source retrieval module that retrieves addresses of communication devices that are close to attack sources at the upstream;
   a module transmitting section that transmits the attack source retrieval module to a communication device in a defense position at the upstream; and
   an attack source determining function section that extracts the address of a communication device to be chosen as an upstream defense position from the candidates of upstream communication device close to the attack sources retrieved by the attack source retrieval module, wherein
   the module transmitting section transmits the protection module to the communication device at the upstream defense position extracted by the attack source determining function section, and also transmits to the upstream communication device the attack packet information related to communication packets detected to be distributed denial of service attacks by the traffic monitoring function section together with the attack source retrieval module, and a traffic examining function section is included in the attack source retrieval module that makes a comparison between communication packets passing through the communication device and the attack packet information received from the module transmitting section and, if it is detected that communication packets that correspond to the attack packet information are passing through the communication device, makes known the fact that the communication device itself is a candidate for the defense position communication device to the transmission source communication device.

2. The communication device according to claim 1, wherein the protection module comprises: an attack traffic monitoring function section that monitors whether or not an attack is continuing; and a self destruct function section that deletes the protection module itself from communication devices currently carrying out process when it is determined by the attack traffic monitoring function section that an attack has ceased.

3. A communication system comprising:

the communication device according to claim 1; and a module server that transmits a program module to the communication device, the module server comprising:

a program module database that stores program modules to be installed on the communication device;

a developer database that stores information of program module developers who are authorized to upload program modules;

a user database that stores information of users who are allowed to request the program modules to be installed on the communication device;

a service menu that displays a list of available program modules to the user;

a service manager that authenticates a user's authorization when the user requests to install a program module displayed on the service menu; and a service module injector that transmits the program module to the communication device upon successful authentication.

4. A communication device for defending against distributed denial of service attacks, comprising:

a traffic monitoring function section that monitors communication packets passing through the communication device and detects distributed denial of service attacks;

a protection module that destroys distributed denial of service communication packets when a distributed denial of service attack is detected, and performs process to retrieve addresses of communication devices that are close to attack sources at the upstream;

a module transmitting section that transmits the protection module to the upstream communication device wherein the module transmitting section transmits to the upstream communication device the attack packet information related to communication packets detected to be distributed denial of service attacks by the traffic monitoring function section together with the protection module, and a traffic examining function section is included in the protection module that makes a comparison between communication packets passing through the communication device and the attack packet information received from the module transmitting section and detects that communication packets that correspond to the attack packet information are passing through the communication device.

5. The communication device according to claim 4, wherein the protection module comprises: an attack traffic monitoring function section that monitors whether or not an attack is continuing; and a self destruct function section that deletes the protection module itself from communication devices currently carrying out process when it is determined by the attack traffic monitoring function section that an attack has ceased.

6. A communication system comprising:

the communication device according to claim 5; and a module server that transmits a program module to the communication device, the module server comprising:

a program module database that stores program modules to be installed on the communication device;

a developer database that stores information of program module developers who are authorized to upload program modules;

a user database that stores information of users who are allowed to request the program modules to be installed on the communication device;

a service menu that displays a list of available program modules to the user;

a service manager that authenticates a user's authorization when the user requests to install a program module displayed on the service menu; and a service module injector that transmits the program module to the communication device upon successful authentication.

7. A denial of service attack defense method for defending against a distributed denial of service attack comprising the steps of:

when a distributed denial of service attack is detected in a communication device, communication packets of the distributed denial of service attacks are destroyed in the communication device;

at the same time a communication device at the upstream that is close to an attack source of the detected distributed denial of service attack is retrieved;

a program module is transmitted to the upstream communication device obtained as a result of the retrieval;

the process to destroy the distributed denial of service attack packets, the process to retrieve the upstream communication device, and the process to transmit the program module to the upstream communication device are performed by executing the program module in the communication device that received the program module; and a position of the communication device destroying the distributed denial of service attack packets is moved recursively until the position arrives at the communication device at the uppermost stream that is closest to the attack source wherein when the program module is transmitted to the upstream communication device, the attack packet information related to communication packets detected to be distributed denial of service attacks are transmitted to the upstream communication device together with the program module, and by executing the program module in the communication device that received the program module and the attack packet information, a comparison is made between communication packets passing through the communication device and the attack packet information and, if it is detected that communication packets that correspond to the attack packet information are passing through the communication device, the fact that the communication device itself is a candidate for a defense position communication device is made known to the transmission source communication device.

8. The denial of service attack defense method according to claim 7, wherein, by executing the program module in the upstream communication device that received the program module, monitoring of whether or not an attack is continuing is performed and, when it is determined that an attack has ceased, process is performed to delete the program module itself from the communication device.

9. A recording medium on which is recorded a computer program that is executed in a communication device in order to defend against a distributed denial of service attack, the computer program executing the steps of:

- a step in which communication packets passing through the communication device are monitored;
- a step in which, when denial of service attack packets are detected by the monitoring, process to continuously destroy the denial of service attack packets is performed;
- a step in which a determination is made as to whether or not the denial of service attack is a distributed denial of service attack;
- a step in which, if it is determined that the denial of service attack is a distributed denial of service attack, upstream communication devices close to the attack source are extracted by referring to a database, attack source retrieval modules for retrieving an attack source together with attack packet information related to communication packets detected to be distributed denial of service attacks are transmitted to these upstream communication devices, information about defense positions is received from transmission destination communication devices, and protection modules for protecting against an attack are transmitted to upstream communication devices based on the defense position information; and a step in which the attack source retrieval modules make a comparison between the communication packets passing through the communication device and the attack packet information received from a transmission source communication device and if it is detected that communication packets that correspond to the attack packet information are passing through the communication device, making known the fact that the communication device itself is a candidate for the defense position communication device to the transmission source communication device.

10. A recording medium on which is recorded a computer program for retrieving an attack source that is transmitted from a downstream communication device to an upstream communication device in order to provide protection from a distributed denial of service attack and that is executed in the upstream communication device, the computer program executing the steps of:

- a notification step in which communication packets passing through the upstream communication device are compared with the attack packet information related to denial of service attacks, and a check is made as to whether or not the denial of service attack packets are passing through the communication device, and a result of the check are notified to the downstream communication device;
- and a step in which, when the result of the check determines that denial of service attack packets are passing through the communication device;
- a) if there is no other upstream communication device situated closer to the attack source than the upstream communication device itself, the upstream communication device itself acts as the communication device at the uppermost stream and notifies the downstream communication devices;
- b) if there is another upstream communication device situated closer to the attack source than the upstream communication device itself, then if, as a result of transmitting an attack source retrieval computer program to the other upstream communication device, not a single notification is forthcoming from the other upstream communication device stating that denial of service attack packets are passing through, the upstream communication device itself acts as the communication device at the uppermost stream and notifies the downstream communication devices; or
- c) if there is another upstream communication device situated closer to the attack source than the upstream communication device itself, then if, as a result of transmitting an attack source retrieval computer program to the other upstream communication device, one or more notifications are forthcoming from the other upstream communication device stating that denial of service attack packets are passing through, the upstream communication device itself does not act as the communication device at the uppermost stream.

* * * * *